(12) United States Patent
Pacilli et al.

(10) Patent No.: US 12,459,335 B2
(45) Date of Patent: Nov. 4, 2025

(54) THERMOELECTRIC CONDITIONING SYSTEM AND METHODS

(71) Applicant: GENTHERM INCORPORATED, Northville, MI (US)

(72) Inventors: Chad Vincent Pacilli, Windsor (CA); Masahiko Inaba, Chino Hills, CA (US); Rodolfo Ernesto Uribe Palafox, Novi, MI (US); Daniel Charles Guerithault, Ann Arbor, MI (US); Kenneth Turner, Novi, MI (US); Amey Pise, Farmington Hills, MI (US); Scott Wolas, Pasadena, CA (US)

(*) Notice: Subject to any disclaimer, the term of this patent is extended or adjusted under 35 U.S.C. 154(b) by 0 days.

(21) Appl. No.: 18/620,713

(22) Filed: Mar. 28, 2024

(65) Prior Publication Data

US 2024/0239154 A1 Jul. 18, 2024

Related U.S. Application Data

(63) Continuation of application No. 17/309,456, filed as application No. PCT/US2019/063445 on Nov. 26, 2019, now Pat. No. 11,993,132.

(Continued)

(51) Int. Cl.
*B60H 1/22* (2006.01)
*B60H 1/00* (2006.01)

(52) U.S. Cl.
CPC ....... *B60H 1/2225* (2013.01); *B60H 1/00428* (2013.01); *B60H 1/00485* (2013.01);
(Continued)

(58) Field of Classification Search
CPC .............. B60H 1/2225; B60H 1/00428; B60H 1/00485; B60H 1/00785; B60H 1/00807;
(Continued)

(56) References Cited

U.S. PATENT DOCUMENTS

| 413,136 A | 10/1889 | Dewey |
|---|---|---|
| 1,839,156 A | 12/1931 | Lumpkin |

(Continued)

FOREIGN PATENT DOCUMENTS

| CA | 979490 | 12/1975 |
|---|---|---|
| CN | 2128076 | 3/1993 |

(Continued)

OTHER PUBLICATIONS

U.S. Appl. No. 14/821,514, filed Aug. 7, 2015, Lofy.

(Continued)

*Primary Examiner* — Allen R. B. Schult
(74) *Attorney, Agent, or Firm* — Knobbe Martens Olson & Bear LLP

(57) ABSTRACT

A system for thermally conditioning and moving a fluid includes a thermoelectric device to convert electrical energy into thermal energy and produce a temperature change in response to an electrical current being applied thereto. The thermoelectric device can include a main-side and a waste side. A fluid moving device can produce a fluid flow that is in thermal communication with the thermoelectric device so that the thermal energy generated by the thermoelectric device is transferred to or from the fluid flow. A flow control valve selectively can direct the fluid flow along a main-side fluid flow path and/or a waste side fluid flow path.

26 Claims, 15 Drawing Sheets

Related U.S. Application Data

(60) Provisional application No. 62/773,961, filed on Nov. 30, 2018.

(52) U.S. Cl.
CPC ..... *B60H 1/00785* (2013.01); *B60H 1/00807* (2013.01); *B60H 1/00828* (2013.01); *B60H 1/00285* (2013.01); *B60H 1/00478* (2013.01)

(58) Field of Classification Search
CPC ............ B60H 1/00828; B60H 1/00285; B60H 1/00478
See application file for complete search history.

(56) References Cited

U.S. PATENT DOCUMENTS

| | | |
|---|---|---|
| 2,235,620 A | 3/1941 | Nessell |
| 2,362,259 A | 11/1944 | Findley |
| 2,363,168 A | 11/1944 | Findley |
| 2,461,432 A | 2/1949 | Mitchell |
| 2,462,984 A | 3/1949 | Maddison |
| 2,493,067 A | 1/1950 | Goldsmith |
| 2,499,901 A | 3/1950 | Brown, Jr. |
| 2,512,559 A | 6/1950 | Williams |
| 2,519,241 A | 8/1950 | Findley |
| 2,782,834 A | 2/1957 | Vigo |
| 2,791,956 A | 5/1957 | Guest |
| 2,813,708 A | 11/1957 | Frey |
| 2,884,956 A | 5/1959 | Perlin |
| 2,931,286 A | 4/1960 | Fry, Sr. et al. |
| 2,944,404 A | 7/1960 | Fritts |
| 2,949,014 A | 8/1960 | Belton, Jr. et al. |
| 2,959,017 A | 11/1960 | Gilman et al. |
| 2,976,700 A | 3/1961 | Jackson |
| 2,984,077 A | 5/1961 | Gaskill |
| 2,997,514 A | 8/1961 | Roeder, Jr. |
| 3,019,609 A | 2/1962 | Pietsch |
| 3,030,145 A | 4/1962 | Kottemann |
| 3,039,817 A | 6/1962 | Taylor |
| 3,077,079 A | 2/1963 | Pietsch |
| 3,085,405 A | 4/1963 | Frantti |
| 3,090,206 A | 5/1963 | Anders |
| 3,125,860 A | 3/1964 | Reich |
| 3,136,577 A | 6/1964 | Richard |
| 3,137,142 A | 6/1964 | Venema |
| 3,137,523 A | 6/1964 | Karner |
| 3,138,934 A | 6/1964 | Roane |
| 3,178,894 A | 4/1965 | Mole et al. |
| 3,186,240 A | 6/1965 | Daubert |
| 3,196,620 A | 7/1965 | Elfving et al. |
| 3,197,342 A | 7/1965 | Neild |
| 3,212,275 A | 10/1965 | Tillman |
| 3,213,630 A | 10/1965 | Mole |
| 3,236,056 A | 2/1966 | Phillips et al. |
| 3,240,628 A | 3/1966 | Sonntag, Jr. |
| 3,252,504 A | 5/1966 | Newton |
| 3,253,649 A | 5/1966 | Laing |
| 3,266,064 A | 8/1966 | Figman |
| 3,282,267 A | 11/1966 | Eidus |
| 3,298,195 A | 1/1967 | Raskhodoff |
| 3,300,649 A | 1/1967 | Strawn |
| 3,325,312 A | 6/1967 | Sonntag, Jr. |
| 3,326,727 A | 6/1967 | Fritts |
| 3,351,498 A | 11/1967 | Shinn et al. |
| 3,366,164 A | 1/1968 | Newton |
| 3,391,727 A | 7/1968 | Topouszian |
| 3,392,535 A | 7/1968 | Castelet |
| 3,486,177 A | 12/1969 | Marshack |
| 3,527,621 A | 9/1970 | Newton |
| 3,529,310 A | 9/1970 | Olmo |
| 3,550,523 A | 12/1970 | Segal |
| 3,554,809 A | 1/1971 | Craft |
| 3,561,224 A | 2/1971 | Banks et al. |
| 3,599,437 A | 8/1971 | Panas |
| 3,615,870 A | 10/1971 | Crouthamel |
| 3,627,299 A | 12/1971 | Schwartze et al. |
| 3,632,451 A | 1/1972 | Abbott |
| 3,635,037 A | 1/1972 | Hubert |
| 3,640,456 A | 2/1972 | Sturgis |
| 3,648,469 A | 3/1972 | Chapman |
| 3,681,929 A | 8/1972 | Schering |
| 3,703,141 A | 11/1972 | Pernoud |
| 3,767,470 A | 10/1973 | Hines |
| 3,779,307 A | 12/1973 | Weiss et al. |
| 3,786,230 A | 1/1974 | Brandenburg, Jr. |
| 3,817,043 A | 6/1974 | Zoleta |
| 3,819,418 A | 6/1974 | Winkler et al. |
| 3,839,876 A | 10/1974 | Privas |
| 3,870,568 A | 3/1975 | Oesterhelt et al. |
| 3,876,860 A | 4/1975 | Nomura et al. |
| 3,885,126 A | 5/1975 | Sugiyama et al. |
| 3,894,213 A | 7/1975 | Agarwala |
| 3,899,054 A | 8/1975 | Huntress et al. |
| 3,902,923 A | 9/1975 | Evans et al. |
| 3,916,151 A | 10/1975 | Reix |
| 3,926,052 A | 12/1975 | Bechtel |
| 3,927,299 A | 12/1975 | Sturgis |
| 3,928,876 A | 12/1975 | Starr |
| 4,002,108 A | 1/1977 | Drori |
| 4,038,831 A | 8/1977 | Gaudel et al. |
| 4,044,824 A | 8/1977 | Eskeli |
| 4,051,691 A | 10/1977 | Dawkins |
| 4,065,936 A | 1/1978 | Fenton et al. |
| 4,100,963 A | 7/1978 | Dillenbeck |
| 4,124,794 A | 11/1978 | Eder |
| 4,152,094 A | 5/1979 | Honda et al. |
| 4,184,634 A | 1/1980 | Betts et al. |
| 4,193,271 A | 3/1980 | Honigsbaum |
| 4,195,687 A | 4/1980 | Taziker |
| 4,223,205 A | 9/1980 | Sturgis |
| 4,224,565 A | 9/1980 | Sosniak et al. |
| 4,229,687 A | 10/1980 | Newman |
| 4,280,330 A | 7/1981 | Harris et al. |
| 4,281,516 A | 8/1981 | Berthet et al. |
| 4,301,658 A | 11/1981 | Reed |
| 4,314,008 A | 2/1982 | Blake |
| 4,315,599 A | 2/1982 | Biancardi |
| 4,324,845 A | 4/1982 | Stockel |
| 4,336,444 A | 6/1982 | Bice et al. |
| 4,338,944 A | 7/1982 | Arkans |
| 4,373,861 A | 2/1983 | Papst et al. |
| 4,391,009 A | 7/1983 | Schild et al. |
| 4,413,857 A | 11/1983 | Hayashi |
| 4,423,308 A | 12/1983 | Callaway et al. |
| 4,437,702 A | 3/1984 | Agosta |
| 4,438,070 A | 3/1984 | Stephens et al. |
| 4,444,851 A | 4/1984 | Maru |
| 4,448,157 A | 5/1984 | Eckstein et al. |
| 4,459,428 A | 7/1984 | Chou |
| 4,489,568 A | 12/1984 | Shapess |
| 4,491,173 A | 1/1985 | Demand |
| 4,493,939 A | 1/1985 | Blaske et al. |
| 4,494,380 A | 1/1985 | Cross |
| 4,497,973 A | 2/1985 | Heath et al. |
| 4,506,510 A | 3/1985 | Tircot |
| 4,518,700 A | 5/1985 | Stephens |
| 4,518,847 A | 5/1985 | Horst, Sr. et al. |
| 4,531,379 A | 7/1985 | Diefenthaler, Jr. |
| 4,549,134 A | 10/1985 | Weiss |
| 4,554,968 A | 11/1985 | Haas |
| 4,567,351 A | 1/1986 | Kitagawa et al. |
| 4,572,430 A | 2/1986 | Takagi et al. |
| 4,611,089 A | 9/1986 | Elsner et al. |
| 4,639,883 A | 1/1987 | Michaelis |
| 4,658,599 A | 4/1987 | Kajiwara |
| 4,665,707 A | 5/1987 | Hamilton |
| 4,665,971 A | 5/1987 | Sakurai |
| 4,671,567 A | 6/1987 | Frobose |
| 4,677,416 A | 6/1987 | Nishimoto et al. |
| 4,685,727 A | 8/1987 | Cremer et al. |
| 4,688,390 A | 8/1987 | Sawyer |
| 4,704,320 A | 11/1987 | Mizunoya et al. |
| 4,707,995 A | 11/1987 | Assaf |

(56) References Cited

U.S. PATENT DOCUMENTS

| | | |
|---|---|---|
| 4,711,294 A | 12/1987 | Jacobs et al. |
| 4,712,832 A | 12/1987 | Antolini et al. |
| 4,753,682 A | 6/1988 | Cantoni |
| 4,777,802 A | 10/1988 | Feher |
| 4,782,664 A | 11/1988 | Sterna et al. |
| 4,791,274 A | 12/1988 | Horst |
| 4,793,651 A | 12/1988 | Inagaki et al. |
| 4,802,929 A | 2/1989 | Schock |
| 4,806,081 A | 2/1989 | Harmsen et al. |
| 4,812,733 A | 3/1989 | Tobey |
| 4,823,554 A | 4/1989 | Trachtenberg et al. |
| 4,825,488 A | 5/1989 | Bedford |
| 4,828,627 A | 5/1989 | Connery |
| 4,848,090 A | 7/1989 | Peters |
| 4,853,992 A | 8/1989 | Yu |
| 4,858,069 A | 8/1989 | Hughes |
| 4,865,929 A | 9/1989 | Eck |
| 4,905,475 A | 3/1990 | Tuomi |
| 4,907,060 A | 3/1990 | Nelson et al. |
| 4,922,721 A | 5/1990 | Robertson et al. |
| 4,922,998 A | 5/1990 | Carr |
| 4,923,248 A | 5/1990 | Feher |
| 4,947,648 A | 8/1990 | Harwell et al. |
| 4,947,735 A | 8/1990 | Guillemin |
| 4,969,684 A | 11/1990 | Zarotti |
| 4,981,324 A | 1/1991 | Law |
| 4,988,847 A | 1/1991 | Argos et al. |
| 4,997,230 A | 3/1991 | Spitalnick |
| 4,999,576 A | 3/1991 | Levinson |
| 5,002,336 A | 3/1991 | Feher |
| 5,012,325 A | 4/1991 | Mansuria et al. |
| 5,014,909 A | 5/1991 | Yasuo |
| 5,015,545 A | 5/1991 | Brooks |
| 5,016,304 A | 5/1991 | Ryhiner |
| 5,022,462 A | 6/1991 | Flint et al. |
| 5,028,216 A | 7/1991 | Harmsen et al. |
| 5,029,446 A | 7/1991 | Suzuki |
| 5,038,569 A | 8/1991 | Shirota et al. |
| 5,042,566 A | 8/1991 | Hildebrand |
| 5,057,490 A | 10/1991 | Skertic |
| 5,070,937 A | 12/1991 | Mougin et al. |
| 5,071,652 A | 12/1991 | Jones et al. |
| 5,077,709 A | 12/1991 | Feher |
| 5,088,790 A | 2/1992 | Wainwright et al. |
| 5,092,129 A | 3/1992 | Bayes et al. |
| 5,097,674 A | 3/1992 | Imaiida et al. |
| 5,097,829 A | 3/1992 | Quisenberry |
| 5,102,189 A | 4/1992 | Saito et al. |
| 5,106,161 A | 4/1992 | Meiller |
| 5,111,025 A | 5/1992 | Barma et al. |
| 5,111,664 A | 5/1992 | Yang |
| 5,117,638 A | 6/1992 | Feher |
| 5,119,640 A | 6/1992 | Conrad |
| 5,121,047 A | 6/1992 | Goedken et al. |
| 5,125,238 A | 6/1992 | Ragan et al. |
| 5,141,826 A | 8/1992 | Bohm et al. |
| 5,148,977 A | 9/1992 | Hibino et al. |
| 5,166,777 A | 11/1992 | Kataoka |
| 5,167,129 A | 12/1992 | Akasaka |
| 5,187,349 A | 2/1993 | Curhan et al. |
| 5,188,286 A | 2/1993 | Pence, IV |
| 5,193,347 A | 3/1993 | Apisdorf |
| 5,197,291 A | 3/1993 | Levinson |
| 5,198,930 A | 3/1993 | Muratomi |
| 5,229,702 A | 7/1993 | Boehling |
| 5,232,516 A | 8/1993 | Hed |
| 5,255,735 A | 10/1993 | Raghava et al. |
| 5,256,857 A | 10/1993 | Curhan et al. |
| 5,265,599 A | 11/1993 | Stephenson et al. |
| 5,269,145 A | 12/1993 | Krause et al. |
| 5,269,146 A | 12/1993 | Kerner |
| 5,278,936 A | 1/1994 | Shao |
| 5,279,128 A | 1/1994 | Tomatsu et al. |
| 5,291,960 A | 3/1994 | Brandenburg et al. |
| 5,300,197 A | 4/1994 | Mitani et al. |
| 5,303,771 A | 4/1994 | Des Champs |
| 5,316,078 A | 5/1994 | Cesaroni |
| 5,335,381 A | 8/1994 | Chang |
| 5,367,728 A | 11/1994 | Chang |
| 5,372,402 A | 12/1994 | Kuo |
| 5,375,421 A | 12/1994 | Hsieh |
| 5,382,075 A | 1/1995 | Shih |
| 5,385,020 A | 1/1995 | Gwilliam et al. |
| 5,385,382 A | 1/1995 | Single, II et al. |
| 5,386,823 A | 2/1995 | Chen |
| 5,395,708 A | 3/1995 | Hall |
| 5,407,130 A | 4/1995 | Uyeki et al. |
| 5,409,547 A | 4/1995 | Watanabe et al. |
| 5,413,166 A | 5/1995 | Kerner et al. |
| 5,416,935 A | 5/1995 | Nieh |
| 5,419,489 A | 5/1995 | Burd |
| 5,419,780 A | 5/1995 | Suski |
| 5,419,980 A | 5/1995 | Okamoto et al. |
| 5,430,322 A | 7/1995 | Koyanagi et al. |
| 5,431,021 A | 7/1995 | Gwilliam et al. |
| 5,436,519 A | 7/1995 | Takahashi et al. |
| 5,448,788 A | 9/1995 | Wu |
| 5,448,891 A | 9/1995 | Nakagiri et al. |
| 5,449,275 A | 9/1995 | Gluszek et al. |
| 5,450,894 A | 9/1995 | Inoue et al. |
| 5,456,081 A | 10/1995 | Chrysler et al. |
| 5,473,783 A | 12/1995 | Allen |
| 5,483,807 A | 1/1996 | Abersfelder et al. |
| 5,493,742 A | 2/1996 | Klearman |
| 5,493,864 A | 2/1996 | Pomerene et al. |
| 5,497,625 A | 3/1996 | Manz et al. |
| 5,497,632 A | 3/1996 | Robinson |
| 5,499,504 A | 3/1996 | Mill et al. |
| 5,505,520 A | 4/1996 | Frusti et al. |
| 5,515,238 A | 5/1996 | Fritz et al. |
| 5,524,439 A | 6/1996 | Gallup et al. |
| 5,542,503 A | 8/1996 | Dunn et al. |
| 5,544,487 A | 8/1996 | Attey et al. |
| 5,544,488 A | 8/1996 | Reid |
| 5,549,153 A | 8/1996 | Baruschke et al. |
| 5,555,732 A | 9/1996 | Whiticar |
| 5,561,981 A | 10/1996 | Quisenberry et al. |
| 5,576,512 A | 11/1996 | Doke |
| 5,584,084 A | 12/1996 | Klearman et al. |
| 5,584,183 A | 12/1996 | Wright et al. |
| 5,592,363 A | 1/1997 | Atarashi et al. |
| 5,594,609 A | 1/1997 | Lin |
| 5,597,200 A | 1/1997 | Gregory et al. |
| 5,601,399 A | 2/1997 | Okpara et al. |
| 5,605,047 A | 2/1997 | Park et al. |
| 5,606,639 A | 2/1997 | Lehoe et al. |
| 5,613,729 A | 3/1997 | Summer, Jr. |
| 5,613,730 A | 3/1997 | Buie et al. |
| 5,623,195 A | 4/1997 | Bullock et al. |
| 5,623,828 A | 4/1997 | Harrington |
| 5,626,021 A | 5/1997 | Karunasiri et al. |
| 5,626,386 A | 5/1997 | Lush |
| 5,634,342 A | 6/1997 | Peeters et al. |
| 5,637,921 A | 6/1997 | Burward-Hoy |
| 5,640,728 A | 6/1997 | Graebe |
| 5,642,539 A | 7/1997 | Kuo |
| 5,645,314 A | 7/1997 | Liou |
| 5,650,904 A | 7/1997 | Gilley et al. |
| 5,653,111 A | 8/1997 | Attey et al. |
| 5,653,741 A | 8/1997 | Grant |
| 5,660,310 A | 8/1997 | LeGrow |
| 5,667,622 A | 9/1997 | Hasegawa et al. |
| 5,673,964 A | 10/1997 | Roan et al. |
| 5,675,852 A | 10/1997 | Watkins |
| 5,690,849 A | 11/1997 | DeVilbiss et al. |
| 5,692,952 A | 12/1997 | Chih-Hung |
| 5,694,770 A | 12/1997 | Bruck et al. |
| 5,704,213 A | 1/1998 | Smith et al. |
| 5,705,770 A | 1/1998 | Ogassawara et al. |
| 5,715,695 A | 2/1998 | Lord |
| 5,721,804 A | 2/1998 | Greene, III |
| 5,722,249 A | 3/1998 | Miller, Jr. |
| 5,724,818 A | 3/1998 | Iwata et al. |
| 5,725,048 A | 3/1998 | Burk et al. |

(56) References Cited

U.S. PATENT DOCUMENTS

| | | |
|---|---|---|
| 5,729,981 A | 3/1998 | Markus et al. |
| 5,734,122 A | 3/1998 | Aspden |
| 5,761,908 A | 6/1998 | Oas et al. |
| 5,761,909 A | 6/1998 | Hughes et al. |
| 5,772,500 A | 6/1998 | Harvey et al. |
| 5,798,583 A | 8/1998 | Morita |
| 5,800,490 A | 9/1998 | Patz et al. |
| 5,802,855 A | 9/1998 | Yamaguchi et al. |
| 5,802,856 A | 9/1998 | Schaper et al. |
| 5,816,236 A | 10/1998 | Moroi et al. |
| 5,822,993 A | 10/1998 | Attey |
| 5,827,424 A | 10/1998 | Gillis et al. |
| 5,833,321 A | 11/1998 | Kim et al. |
| 5,850,741 A | 12/1998 | Feher |
| 5,865,031 A | 2/1999 | Itakura |
| 5,871,151 A | 2/1999 | Fiedrich |
| 5,871,859 A | 2/1999 | Parise |
| 5,884,485 A | 3/1999 | Yamaguchi et al. |
| 5,884,486 A | 3/1999 | Hughes et al. |
| 5,887,304 A | 3/1999 | Von der Heyde |
| 5,888,261 A | 3/1999 | Fortune |
| 5,890,371 A | 4/1999 | Rajasubramanian et al. |
| 5,895,964 A | 4/1999 | Nakayama |
| 5,899,086 A | 5/1999 | Noda et al. |
| 5,901,572 A | 5/1999 | Peiffer et al. |
| 5,902,014 A | 5/1999 | Dinkel et al. |
| RE36,242 E | 6/1999 | Apisdorf |
| 5,912,092 A | 6/1999 | Maruyama et al. |
| 5,918,930 A | 7/1999 | Kawai et al. |
| 5,921,088 A | 7/1999 | Imaizumi et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,289 A | 7/1999 | Bishop, II |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 5,936,192 A | 8/1999 | Tauchi |
| 5,937,908 A | 8/1999 | Inoshiri et al. |
| 5,948,303 A | 9/1999 | Larson |
| 5,950,067 A | 9/1999 | Maegawa et al. |
| 5,952,728 A | 9/1999 | Imanishi et al. |
| 5,955,772 A | 9/1999 | Shakouri et al. |
| 5,964,092 A | 10/1999 | Tozuka et al. |
| 5,966,940 A | 10/1999 | Gower et al. |
| 5,966,941 A | 10/1999 | Ghoshal |
| 5,975,856 A | 11/1999 | Welle |
| 5,977,785 A | 11/1999 | Burward-Hoy |
| 5,987,890 A | 11/1999 | Chiu et al. |
| 5,987,893 A | 11/1999 | Schultz-Harder et al. |
| 5,988,568 A | 11/1999 | Drews |
| 5,992,154 A | 11/1999 | Kawada et al. |
| 5,994,637 A | 11/1999 | Imanushi et al. |
| 5,995,711 A | 11/1999 | Fukuoka et al. |
| 6,000,225 A | 12/1999 | Ghoshal |
| 6,003,950 A | 12/1999 | Larsson |
| 6,006,524 A | 12/1999 | Park |
| 6,019,420 A | 2/2000 | Faust et al. |
| 6,028,263 A | 2/2000 | Kobayashi et al. |
| 6,038,865 A | 3/2000 | Watanabe et al. |
| 6,048,024 A | 4/2000 | Wallman |
| 6,049,655 A | 4/2000 | Vazirani |
| 6,050,326 A | 4/2000 | Evans |
| 6,052,853 A | 4/2000 | Schmid |
| 6,053,163 A | 4/2000 | Bass |
| 6,057,050 A | 5/2000 | Parise |
| 6,059,018 A | 5/2000 | Yoshinori et al. |
| 6,059,198 A | 5/2000 | Moroi et al. |
| 6,062,641 A | 5/2000 | Suzuki et al. |
| 6,072,924 A | 6/2000 | Sato et al. |
| 6,072,938 A | 6/2000 | Peterson et al. |
| 6,073,998 A | 6/2000 | Siarkowski et al. |
| 6,079,485 A | 6/2000 | Esaki et al. |
| 6,082,445 A | 7/2000 | Dugan |
| 6,084,172 A | 7/2000 | Kishi et al. |
| 6,085,369 A | 7/2000 | Feher |
| 6,086,831 A | 7/2000 | Harness et al. |
| 6,087,638 A | 7/2000 | Silverbrook |
| 6,094,919 A | 8/2000 | Bhatia |
| 6,097,088 A | 8/2000 | Sakuragi |
| 6,100,463 A | 8/2000 | Ladd et al. |
| 6,101,815 A | 8/2000 | Van Oort et al. |
| 6,103,967 A | 8/2000 | Cauchy et al. |
| 6,105,373 A | 8/2000 | Watanabe et al. |
| 6,105,659 A | 8/2000 | Pocol et al. |
| 6,109,688 A | 8/2000 | Wurz et al. |
| 6,112,525 A | 9/2000 | Yoshida et al. |
| 6,112,531 A | 9/2000 | Yamaguchi |
| 6,116,029 A | 9/2000 | Krawec |
| 6,119,463 A | 9/2000 | Bell |
| 6,120,370 A | 9/2000 | Asou et al. |
| 6,127,619 A | 10/2000 | Xi et al. |
| 6,138,466 A | 10/2000 | Lake et al. |
| 6,138,749 A | 10/2000 | Kawai et al. |
| 6,141,969 A | 11/2000 | Launchbury et al. |
| 6,145,925 A | 11/2000 | Eksin et al. |
| 6,158,224 A | 12/2000 | Hu et al. |
| 6,158,225 A | 12/2000 | Muto et al. |
| 6,161,241 A | 12/2000 | Zysman |
| 6,161,388 A | 12/2000 | Ghoshal |
| 6,164,076 A | 12/2000 | Chu et al. |
| 6,164,719 A | 12/2000 | Rauh |
| 6,166,905 A | 12/2000 | Oyamada et al. |
| 6,171,333 B1 | 1/2001 | Nelson et al. |
| 6,178,292 B1 | 1/2001 | Fukuoka et al. |
| 6,179,706 B1 | 1/2001 | Yoshinori et al. |
| 6,186,592 B1 | 2/2001 | Orizakis et al. |
| 6,189,966 B1 | 2/2001 | Faust et al. |
| 6,189,967 B1 | 2/2001 | Short |
| 6,196,627 B1 | 3/2001 | Faust et al. |
| 6,196,839 B1 | 3/2001 | Ross |
| 6,205,802 B1 | 3/2001 | Drucker et al. |
| 6,205,805 B1 | 3/2001 | Takahashi et al. |
| 6,206,465 B1 | 3/2001 | Faust et al. |
| 6,213,198 B1 | 4/2001 | Shikata et al. |
| 6,222,243 B1 | 4/2001 | Kishi et al. |
| 6,223,539 B1 | 5/2001 | Bell |
| 6,233,959 B1 | 5/2001 | Kang et al. |
| 6,250,083 B1 | 6/2001 | Chou |
| 6,256,996 B1 | 7/2001 | Ghoshal |
| 6,257,329 B1 | 7/2001 | Balzano |
| 6,262,357 B1 | 7/2001 | Johnson et al. |
| 6,263,530 B1 | 7/2001 | Feher |
| 6,266,962 B1 | 7/2001 | Ghoshal |
| 6,282,907 B1 | 9/2001 | Ghoshal |
| 6,289,982 B1 | 9/2001 | Naji |
| 6,291,803 B1 | 9/2001 | Fourrey |
| 6,293,107 B1 | 9/2001 | Kitagawa |
| 6,294,721 B1 | 9/2001 | Oravetz et al. |
| 6,306,673 B1 | 10/2001 | Imanishi et al. |
| 6,320,280 B1 | 11/2001 | Kanesaka |
| 6,324,860 B1 | 12/2001 | Maeda et al. |
| 6,326,610 B1 | 12/2001 | Muramatsu et al. |
| 6,334,311 B1 | 1/2002 | Kim et al. |
| 6,336,237 B1 | 1/2002 | Schmid |
| 6,338,251 B1 | 1/2002 | Ghoshal |
| 6,341,395 B1 | 1/2002 | Chao |
| 6,343,011 B1 | 1/2002 | Yu |
| 6,345,507 B1 | 2/2002 | Gillen |
| 6,346,668 B1 | 2/2002 | McGrew |
| 6,347,521 B1 | 2/2002 | Kadotani et al. |
| 6,366,832 B2 | 4/2002 | Lomonaco et al. |
| 6,378,311 B1 | 4/2002 | McCordic |
| 6,385,976 B1 | 5/2002 | Yamamura et al. |
| 6,391,676 B1 | 5/2002 | Tsuzaki et al. |
| 6,393,842 B2 | 5/2002 | Kim et al. |
| 6,400,013 B1 | 6/2002 | Tsuzaki et al. |
| 6,401,462 B1 | 6/2002 | Bielinski |
| 6,402,470 B1 | 6/2002 | Kvasnak et al. |
| 6,410,971 B1 | 6/2002 | Otey |
| 6,412,287 B1 | 7/2002 | Hughes et al. |
| 6,425,527 B1 | 7/2002 | Smole |
| 6,427,449 B1 | 8/2002 | Logan et al. |

(56) References Cited

U.S. PATENT DOCUMENTS

| | | |
|---|---|---|
| 6,434,328 B2 | 8/2002 | Rutherford |
| 6,438,964 B1 | 8/2002 | Giblin |
| 6,444,893 B1 | 9/2002 | Onoue et al. |
| 6,452,740 B1 | 9/2002 | Ghoshal |
| 6,455,186 B1 | 9/2002 | Moores, Jr. et al. |
| 6,457,324 B2 | 10/2002 | Zeigler et al. |
| 6,464,027 B1 | 10/2002 | Dage et al. |
| 6,470,696 B1 | 10/2002 | Palfy et al. |
| 6,474,073 B1 | 11/2002 | Uetsuji et al. |
| 6,474,081 B1 | 11/2002 | Feuerecker |
| 6,481,213 B2 | 11/2002 | Carr et al. |
| 6,481,801 B1 | 11/2002 | Schmale |
| 6,487,739 B1 | 12/2002 | Harker |
| 6,489,551 B2 | 12/2002 | Chu et al. |
| 6,490,879 B1 | 12/2002 | Lloyd et al. |
| 6,492,585 B1 | 12/2002 | Zamboni et al. |
| 6,493,888 B1 | 12/2002 | Salvatini et al. |
| 6,493,889 B2 | 12/2002 | Kocurek |
| 6,509,704 B1 | 1/2003 | Brown |
| 6,510,696 B2 | 1/2003 | Guttman et al. |
| 6,511,125 B1 | 1/2003 | Gendron |
| 6,519,949 B1 | 2/2003 | Wernlund et al. |
| 6,530,231 B1 | 3/2003 | Nagy et al. |
| 6,530,920 B1 | 3/2003 | Whitcroft et al. |
| 6,539,725 B2 | 4/2003 | Bell |
| 6,539,729 B2 | 4/2003 | Tupis et al. |
| 6,541,737 B1 | 4/2003 | Eksin et al. |
| 6,541,743 B2 | 4/2003 | Chen |
| 6,546,576 B1 | 4/2003 | Lin |
| 6,548,894 B2 | 4/2003 | Chu et al. |
| 6,552,256 B2 | 4/2003 | Shakouri et al. |
| 6,552,464 B1 | 4/2003 | Rahbar et al. |
| 6,557,353 B1 | 5/2003 | Fusco et al. |
| 6,560,968 B2 | 5/2003 | Ko |
| 6,569,550 B2 | 5/2003 | Khelifa |
| 6,570,362 B1 | 5/2003 | Estes et al. |
| RE38,128 E | 6/2003 | Gallup et al. |
| 6,571,564 B2 | 6/2003 | Upadhye et al. |
| 6,573,596 B2 | 6/2003 | Saika |
| 6,574,967 B1 | 6/2003 | Park et al. |
| 6,578,986 B1 | 6/2003 | Swaris et al. |
| 6,580,025 B2 | 6/2003 | Guy |
| 6,581,225 B1 | 6/2003 | Imai |
| 6,583,638 B2 | 6/2003 | Costello et al. |
| 6,588,217 B2 | 7/2003 | Ghoshal |
| 6,598,251 B2 | 7/2003 | Habboub et al. |
| 6,598,403 B1 | 7/2003 | Ghoshal |
| 6,598,405 B2 | 7/2003 | Bell |
| 6,604,576 B2 | 8/2003 | Noda et al. |
| 6,604,785 B2 | 8/2003 | Bargheer et al. |
| 6,605,955 B1 | 8/2003 | Costello et al. |
| 6,606,754 B1 | 8/2003 | Flick |
| 6,606,866 B2 | 8/2003 | Bell |
| 6,606,877 B2 | 8/2003 | Tomita et al. |
| 6,607,142 B1 | 8/2003 | Boggs et al. |
| 6,619,044 B2 | 9/2003 | Batchelor et al. |
| 6,619,736 B2 | 9/2003 | Stowe et al. |
| 6,625,990 B2 | 9/2003 | Bell |
| 6,626,488 B2 | 9/2003 | Pfahler |
| 6,629,724 B2 | 10/2003 | Ekern et al. |
| 6,637,210 B2 | 10/2003 | Bell |
| 6,640,889 B1 | 11/2003 | Harte et al. |
| 6,644,735 B2 | 11/2003 | Bargheer et al. |
| 6,645,666 B1 | 11/2003 | Moores, Jr. et al. |
| 6,653,002 B1 | 11/2003 | Parise |
| 6,653,607 B2 | 11/2003 | Ellis et al. |
| 6,658,861 B1 | 12/2003 | Ghoshal et al. |
| 6,672,076 B2 | 1/2004 | Bell |
| 6,676,207 B2 | 1/2004 | Rauh et al. |
| 6,682,844 B2 | 1/2004 | Gene |
| 6,684,437 B2 | 2/2004 | Koenig |
| 6,686,532 B1 | 2/2004 | Macris |
| 6,687,937 B2 | 2/2004 | Harker |
| 6,695,402 B2 | 2/2004 | Sloan, Jr. |
| 6,700,052 B2 | 3/2004 | Bell |
| 6,705,089 B2 | 3/2004 | Chu et al. |
| 6,708,352 B2 | 3/2004 | Salvatini et al. |
| 6,711,767 B2 | 3/2004 | Klamm |
| 6,711,904 B1 | 3/2004 | Law et al. |
| 6,715,307 B2 | 4/2004 | Hatakeyama et al. |
| 6,719,039 B2 | 4/2004 | Calaman et al. |
| 6,722,139 B2 | 4/2004 | Moon et al. |
| 6,725,669 B2 | 4/2004 | Melaragni |
| 6,727,422 B2 | 4/2004 | Macris |
| 6,730,115 B1 | 5/2004 | Heaton |
| 6,732,534 B2 | 5/2004 | Spry |
| 6,739,138 B2 | 5/2004 | Saunders et al. |
| 6,739,655 B1 | 5/2004 | Schwochert et al. |
| 6,743,972 B2 | 6/2004 | Macris |
| 6,761,399 B2 | 7/2004 | Bargheer et al. |
| 6,764,502 B2 | 7/2004 | Bieberich |
| 6,767,666 B2 | 7/2004 | Nemoto |
| 6,767,766 B2 | 7/2004 | Chu et al. |
| 6,772,829 B2 | 8/2004 | Lebrun |
| 6,774,346 B2 | 8/2004 | Clothier |
| 6,779,348 B2 | 8/2004 | Taban |
| 6,786,541 B2 | 9/2004 | Haupt et al. |
| 6,786,545 B2 | 9/2004 | Bargheer et al. |
| 6,790,481 B2 | 9/2004 | Bishop et al. |
| 6,793,016 B2 | 9/2004 | Aoki et al. |
| 6,804,966 B1 | 10/2004 | Chu et al. |
| 6,807,811 B2 | 10/2004 | Lee |
| 6,808,230 B2 | 10/2004 | Buss et al. |
| 6,812,395 B2 | 11/2004 | Bell |
| 6,815,814 B2 | 11/2004 | Chu et al. |
| 6,817,191 B2 | 11/2004 | Watanabe |
| 6,817,197 B1 | 11/2004 | Padfield |
| 6,817,675 B2 | 11/2004 | Buss et al. |
| 6,818,817 B2 | 11/2004 | Macris |
| 6,823,678 B1 | 11/2004 | Li |
| 6,828,528 B2 | 12/2004 | Stowe et al. |
| 6,832,732 B2 | 12/2004 | Burkett et al. |
| 6,834,509 B2 | 12/2004 | Palfy et al. |
| 6,840,305 B2 | 1/2005 | Zheng et al. |
| 6,840,576 B2 | 1/2005 | Ekern et al. |
| 6,841,957 B2 | 1/2005 | Brown |
| 6,845,622 B2 | 1/2005 | Sauciuc et al. |
| 6,854,286 B2 | 2/2005 | Bureau et al. |
| 6,855,158 B2 | 2/2005 | Stolpmann |
| 6,855,880 B2 | 2/2005 | Feher |
| 6,857,697 B2 | 2/2005 | Brennan et al. |
| 6,857,954 B2 | 2/2005 | Luedtke |
| 6,862,892 B1 | 3/2005 | Meyer et al. |
| 6,868,690 B2 | 3/2005 | Faqih |
| 6,871,365 B2 | 3/2005 | Flick et al. |
| 6,876,549 B2 | 4/2005 | Beitman et al. |
| 6,883,602 B2 | 4/2005 | Drucker |
| 6,886,351 B2 | 5/2005 | Palfy et al. |
| 6,886,356 B2 | 5/2005 | Kubo et al. |
| 6,892,807 B2 | 5/2005 | Fristedt et al. |
| 6,893,086 B2 | 5/2005 | Bajic et al. |
| 6,896,047 B2 | 5/2005 | Currle et al. |
| 6,904,629 B2 | 6/2005 | Wu |
| 6,907,739 B2 | 6/2005 | Bell |
| 6,910,345 B2 | 6/2005 | Horstmann et al. |
| 6,916,160 B2 | 7/2005 | Obara |
| 6,923,216 B2 | 8/2005 | Extrand et al. |
| 6,933,469 B2 | 8/2005 | Ellis et al. |
| 6,935,122 B2 | 8/2005 | Huang |
| 6,949,309 B2 | 9/2005 | Moores, Jr. et al. |
| 6,951,114 B2 | 10/2005 | Grisham et al. |
| 6,954,944 B2 | 10/2005 | Feher |
| 6,959,555 B2 | 11/2005 | Bell |
| 6,962,195 B2 | 11/2005 | Smith et al. |
| 6,963,053 B2 | 11/2005 | Lutz |
| 6,967,309 B2 | 11/2005 | Wyatt et al. |
| 6,973,799 B2 | 12/2005 | Kuehl et al. |
| 6,976,734 B2 | 12/2005 | Stoewe |
| 6,977,360 B2 | 12/2005 | Weiss |
| 6,981,380 B2 | 1/2006 | Chrysler et al. |
| 6,986,247 B1 | 1/2006 | Parise |
| 6,990,701 B1 | 1/2006 | Litvak |
| 7,000,490 B1 | 2/2006 | Micheels |
| 7,007,491 B2 | 3/2006 | Grimm et al. |

(56) References Cited

U.S. PATENT DOCUMENTS

| | | |
|---|---|---|
| 7,014,945 B2 | 3/2006 | Moores, Jr. et al. |
| 7,036,163 B2 | 5/2006 | Schmid |
| 7,040,710 B2 | 5/2006 | White et al. |
| 7,052,091 B2 | 5/2006 | Bajic et al. |
| 7,056,616 B2 | 6/2006 | Moores, Jr. et al. |
| 7,061,208 B2 | 6/2006 | Nishihata et al. |
| 7,063,163 B2 | 6/2006 | Steele et al. |
| 7,066,306 B2 | 6/2006 | Gavin |
| 7,070,231 B1 | 7/2006 | Wong |
| 7,070,232 B2 | 7/2006 | Minegishi et al. |
| 7,071,587 B2 | 7/2006 | Lopatinsky et al. |
| 7,073,338 B2 | 7/2006 | Harwood et al. |
| 7,075,034 B2 | 7/2006 | Bargheer et al. |
| 7,082,772 B2 | 8/2006 | Welch |
| 7,084,502 B2 | 8/2006 | Bottner et al. |
| 7,089,756 B2 | 8/2006 | Hu |
| 7,100,978 B2 | 9/2006 | Ekern et al. |
| 7,108,319 B2 | 9/2006 | Hartwich et al. |
| 7,111,465 B2 | 9/2006 | Bell |
| 7,114,771 B2 | 10/2006 | Lofy et al. |
| 7,124,593 B2 | 10/2006 | Feher |
| 7,131,689 B2 | 11/2006 | Brennan et al. |
| 7,134,288 B2 | 11/2006 | Crippen et al. |
| 7,134,715 B1 | 11/2006 | Fristedt et al. |
| 7,141,763 B2 | 11/2006 | Moroz |
| 7,147,279 B2 | 12/2006 | Bevan et al. |
| 7,165,281 B2 | 1/2007 | Larssson et al. |
| 7,168,398 B2 | 1/2007 | Ap et al. |
| 7,168,758 B2 | 1/2007 | Bevan et al. |
| 7,171,955 B2 | 2/2007 | Perkins |
| 7,178,344 B2 | 2/2007 | Bell |
| 7,201,441 B2 | 4/2007 | Stoewe et al. |
| 7,202,444 B2 | 4/2007 | Bulgajewski |
| 7,213,876 B2 | 5/2007 | Stoewe |
| 7,220,048 B2 | 5/2007 | Kohlgrüber et al. |
| 7,224,059 B2 | 5/2007 | Shimada et al. |
| 7,230,404 B2 | 6/2007 | Kimoto et al. |
| 7,231,772 B2 | 6/2007 | Bell |
| 7,238,101 B2 | 7/2007 | Kadle et al. |
| 7,244,887 B2 | 7/2007 | Miley |
| 7,246,496 B2 | 7/2007 | Goenka et al. |
| 7,252,904 B2 | 8/2007 | Moores, Jr. et al. |
| 7,263,835 B2 | 9/2007 | Lin |
| 7,270,910 B2 | 9/2007 | Yahnker et al. |
| 7,272,936 B2 | 9/2007 | Feher |
| 7,273,981 B2 | 9/2007 | Bell |
| 7,299,639 B2 | 11/2007 | Leija et al. |
| 7,310,953 B2 | 12/2007 | Pham et al. |
| 7,320,223 B1 | 1/2008 | Dabney et al. |
| 7,326,490 B2 | 2/2008 | Moores, Jr. et al. |
| 7,337,615 B2 | 3/2008 | Reidy |
| 7,338,117 B2 | 3/2008 | Iqbal et al. |
| 7,340,907 B2 | 3/2008 | Vogh et al. |
| 7,355,146 B2 | 4/2008 | Angelis et al. |
| 7,356,912 B2 | 4/2008 | Iqbal |
| 7,360,365 B2 | 4/2008 | Codecasa et al. |
| 7,360,416 B2 | 4/2008 | Manaka et al. |
| 7,363,766 B2 | 4/2008 | Eisenhour |
| 7,370,479 B2 | 5/2008 | Pfannenberg |
| 7,370,911 B2 | 5/2008 | Bajic et al. |
| 7,380,586 B2 | 6/2008 | Gawthrop |
| 7,384,704 B2 | 6/2008 | Scott |
| 7,425,034 B2 | 9/2008 | Bajic et al. |
| 7,426,835 B2 | 9/2008 | Bell et al. |
| 7,462,028 B2 | 12/2008 | Cherala et al. |
| 7,469,432 B2 | 12/2008 | Chambers |
| 7,475,464 B2 | 1/2009 | Lofy et al. |
| 7,475,938 B2 | 1/2009 | Stoewe et al. |
| 7,478,869 B2 | 1/2009 | Lazanja et al. |
| 7,480,950 B2 | 1/2009 | Feher |
| 7,506,924 B2 | 3/2009 | Bargheer et al. |
| 7,506,938 B2 | 3/2009 | Brennan et al. |
| 7,513,273 B2 | 4/2009 | Bivin |
| 7,531,270 B2 | 5/2009 | Buck et al. |
| 7,533,535 B2 | 5/2009 | Kadle et al. |
| 7,581,785 B2 | 9/2009 | Heckmann et al. |
| 7,587,901 B2 | 9/2009 | Petrovski |
| 7,587,902 B2 | 9/2009 | Bell |
| 7,591,507 B2 | 9/2009 | Giffin et al. |
| 7,592,776 B2 | 9/2009 | Tsukamoto et al. |
| 7,608,777 B2 | 10/2009 | Bell et al. |
| 7,621,594 B2 | 11/2009 | Hartmann et al. |
| 7,640,754 B2 | 1/2010 | Wolas |
| 7,665,803 B2 | 2/2010 | Wolas |
| 7,708,338 B2 | 5/2010 | Wolas |
| 7,731,279 B2 | 6/2010 | Asada et al. |
| 7,743,614 B2 | 6/2010 | Goenka et al. |
| 7,779,639 B2 | 8/2010 | Goenka |
| 7,784,289 B2 | 8/2010 | Scherer |
| RE41,765 E | 9/2010 | Gregory et al. |
| 7,788,933 B2 | 9/2010 | Goenka |
| 7,827,620 B2 | 11/2010 | Feher |
| 7,827,805 B2 | 11/2010 | Comiskey et al. |
| 7,832,214 B2 | 11/2010 | Ito et al. |
| 7,862,113 B2 | 1/2011 | Knoll |
| 7,863,866 B2 | 1/2011 | Wolf |
| 7,866,017 B2 | 1/2011 | Knoll |
| 7,870,745 B2 | 1/2011 | Goenka |
| 7,870,892 B2 | 1/2011 | Gawthrop |
| 7,877,827 B2 | 2/2011 | Marquette et al. |
| 7,926,293 B2 | 4/2011 | Bell |
| 7,937,789 B2 | 5/2011 | Feher |
| 7,946,120 B2 | 5/2011 | Bell |
| 7,963,594 B2 | 6/2011 | Wolas |
| 7,966,835 B2 | 6/2011 | Petrovski |
| 7,969,738 B2 | 6/2011 | Koo |
| 7,996,936 B2 | 8/2011 | Marquette et al. |
| 8,062,797 B2 | 11/2011 | Fisher et al. |
| 8,065,763 B2 | 11/2011 | Brykalski et al. |
| 8,069,674 B2 | 12/2011 | Bell |
| 8,104,294 B2 | 1/2012 | Reeve |
| 8,104,295 B2 | 1/2012 | Lofy |
| 8,143,554 B2 | 3/2012 | Lofy |
| 8,163,647 B2 | 4/2012 | Kawabata et al. |
| 8,181,290 B2 | 5/2012 | Brykalski et al. |
| 8,191,187 B2 | 6/2012 | Brykalski et al. |
| 8,222,511 B2 | 7/2012 | Lofy |
| 8,256,236 B2 | 9/2012 | Lofy |
| 8,261,868 B2 | 9/2012 | Goenka et al. |
| 8,332,975 B2 | 12/2012 | Brykalski et al. |
| 8,359,871 B2 | 1/2013 | Woods et al. |
| 8,397,518 B1 | 3/2013 | Vistakula |
| 8,402,579 B2 | 3/2013 | Marquette et al. |
| 8,405,363 B2 | 3/2013 | Lee |
| 8,408,012 B2 | 4/2013 | Goenka et al. |
| 8,418,286 B2 | 4/2013 | Brykalski et al. |
| 8,434,314 B2 | 5/2013 | Comiskey et al. |
| 8,438,863 B2 | 5/2013 | Lofy |
| RE44,272 E | 6/2013 | Bell |
| 8,490,412 B2 | 7/2013 | Bell et al. |
| 8,492,642 B2 | 7/2013 | Kim |
| 8,495,884 B2 | 7/2013 | Bell et al. |
| 8,505,320 B2 | 8/2013 | Lofy |
| 8,516,842 B2 | 8/2013 | Petrovski |
| 8,539,624 B2 | 9/2013 | Terech et al. |
| 8,575,518 B2 | 11/2013 | Walsh |
| 8,613,200 B2 | 12/2013 | LaGrandeur et al. |
| 8,621,687 B2 | 1/2014 | Brykalski et al. |
| 8,631,659 B2 | 1/2014 | Goenka |
| 8,653,763 B2 | 2/2014 | Lin et al. |
| 8,701,422 B2 | 4/2014 | Bell et al. |
| 8,722,222 B2 | 5/2014 | Kossakovski et al. |
| 8,732,874 B2 | 5/2014 | Brykalski et al. |
| 8,777,320 B2 | 7/2014 | Stoll et al. |
| 8,782,830 B2 | 7/2014 | Brykalski et al. |
| 8,783,397 B2 | 7/2014 | Goenka et al. |
| 8,841,015 B2 | 9/2014 | Yoon |
| 8,869,596 B2 | 10/2014 | Hagl |
| 8,893,329 B2 | 11/2014 | Petrovksi |
| 8,893,513 B2 | 11/2014 | June et al. |
| 8,915,091 B2 | 12/2014 | Goenka |
| 8,955,578 B2 | 2/2015 | Kwon et al. |
| 8,974,942 B2 | 3/2015 | Bell et al. |
| 9,027,360 B2 | 5/2015 | Chainer et al. |

(56) References Cited

U.S. PATENT DOCUMENTS

| | | |
|---|---|---|
| 9,038,400 B2 | 5/2015 | Goenka |
| 9,103,573 B2 | 8/2015 | Goenka et al. |
| 9,105,808 B2 | 8/2015 | Petrovksi |
| 9,105,809 B2 | 8/2015 | Lofy |
| 9,121,414 B2 | 9/2015 | Lofy et al. |
| 9,125,497 B2 | 9/2015 | Brykalski et al. |
| 9,310,112 B2 | 4/2016 | Bell et al. |
| 9,335,073 B2 | 5/2016 | Lofy |
| 9,365,090 B2 | 6/2016 | Gawthrop et al. |
| 9,366,461 B2 | 6/2016 | Bell et al. |
| 9,445,524 B2 | 9/2016 | Lofy et al. |
| 9,447,994 B2 | 9/2016 | Barnhart et al. |
| 9,451,723 B2 | 9/2016 | Lofy et al. |
| 9,555,686 B2 | 1/2017 | Ranalli et al. |
| 9,590,282 B2 | 3/2017 | Kossakovski et al. |
| 9,603,459 B2 | 3/2017 | Brykalski et al. |
| 9,622,588 B2 | 4/2017 | Brykalski et al. |
| 9,651,279 B2 | 5/2017 | Lofy |
| 9,662,962 B2 | 5/2017 | Steinman et al. |
| 9,666,914 B2 | 5/2017 | Bell et al. |
| 9,671,142 B2 | 6/2017 | Kossakovski et al. |
| 9,685,599 B2 | 6/2017 | Petrovski et al. |
| 9,719,701 B2 | 8/2017 | Bell et al. |
| 9,797,631 B2 | 10/2017 | Grunwald et al. |
| 9,814,641 B2 | 11/2017 | Brykalski et al. |
| 9,857,107 B2 | 1/2018 | Inaba et al. |
| 9,899,711 B2 | 2/2018 | Piggott et al. |
| 9,958,190 B2 | 5/2018 | West |
| 9,989,267 B2 | 6/2018 | Brykalski et al. |
| 10,005,337 B2 | 6/2018 | Petrovski |
| 10,106,011 B2 | 10/2018 | Goenka |
| 10,160,356 B2 | 12/2018 | Lofy et al. |
| 10,170,811 B2 | 1/2019 | Kossakovski et al. |
| 10,208,990 B2 | 2/2019 | Petrovski et al. |
| 10,219,323 B2 | 2/2019 | Inaba et al. |
| 10,228,166 B2 | 3/2019 | Lofy |
| 10,236,547 B2 | 3/2019 | Kossakovski et al. |
| 10,266,031 B2 | 4/2019 | Steinman et al. |
| 10,270,141 B2 | 4/2019 | Piggott et al. |
| 10,288,084 B2 | 5/2019 | Lofy et al. |
| 10,290,796 B2 | 5/2019 | Boukai et al. |
| 10,337,770 B2 | 7/2019 | Kossakovski et al. |
| 10,405,667 B2 | 9/2019 | Marquette et al. |
| 10,457,173 B2 | 10/2019 | Lofy et al. |
| 10,495,322 B2 | 12/2019 | Brykalski et al. |
| 10,558,229 B2 | 2/2020 | Kates |
| 10,647,230 B2 | 5/2020 | Fujii et al. |
| 10,647,232 B2 | 5/2020 | Lofy et al. |
| 10,686,232 B2 | 6/2020 | Kossakovski et al. |
| 10,700,393 B2 | 6/2020 | Piggott et al. |
| 10,773,617 B2 | 9/2020 | Zhang |
| 10,784,546 B2 | 9/2020 | Piggott et al. |
| 10,991,869 B2 | 4/2021 | Jovovic et al. |
| 11,033,058 B2 | 6/2021 | Cauchy |
| 11,075,331 B2 | 7/2021 | Bück |
| 11,152,557 B2 | 10/2021 | Jovovic et al. |
| 11,223,004 B2 | 1/2022 | Jovovic |
| 11,264,655 B2 | 3/2022 | Bell et al. |
| 11,408,438 B2 | 8/2022 | Lofy et al. |
| 11,639,816 B2 | 5/2023 | Cauchy |
| 11,774,128 B2 | 10/2023 | Costa et al. |
| 11,857,004 B2 | 1/2024 | Cauchy |
| 11,993,132 B2 | 5/2024 | Pacilli et al. |
| 12,025,151 B2 | 7/2024 | Lofy et al. |
| 2001/0005990 A1 | 7/2001 | Kim et al. |
| 2001/0014212 A1 | 8/2001 | Rutherford |
| 2001/0028185 A1 | 10/2001 | Stowe et al. |
| 2002/0017102 A1 | 2/2002 | Bell |
| 2002/0026226 A1 | 2/2002 | Ein |
| 2002/0062854 A1 | 5/2002 | Sharp |
| 2002/0092308 A1 | 7/2002 | Bell |
| 2002/0100121 A1 | 8/2002 | Kocurek |
| 2002/0108380 A1 | 8/2002 | Nelsen et al. |
| 2002/0121094 A1 | 9/2002 | VanHoudt |
| 2002/0136944 A1 | 9/2002 | Nemoto et al. |
| 2002/0171132 A1 | 11/2002 | Buchwalter et al. |
| 2002/0195844 A1 | 12/2002 | Hipwell |
| 2003/0039298 A1 | 2/2003 | Eriksson et al. |
| 2003/0041892 A1 | 3/2003 | Fleurial et al. |
| 2003/0070235 A1 | 4/2003 | Suzuki et al. |
| 2003/0084511 A1 | 5/2003 | Salvatini et al. |
| 2003/0110779 A1 | 6/2003 | Otey et al. |
| 2003/0133492 A1 | 7/2003 | Watanabe |
| 2003/0140636 A1 | 7/2003 | Van Winkle |
| 2003/0145380 A1 | 8/2003 | Schmid |
| 2003/0150060 A1 | 8/2003 | Huang |
| 2003/0160479 A1 | 8/2003 | Minuth et al. |
| 2003/0188382 A1 | 10/2003 | Klamm et al. |
| 2003/0234247 A1 | 12/2003 | Stern |
| 2004/0025516 A1 | 2/2004 | Van Winkle |
| 2004/0090093 A1 | 5/2004 | Kamiya et al. |
| 2004/0098991 A1 | 5/2004 | Heyes |
| 2004/0113549 A1 | 6/2004 | Roberts et al. |
| 2004/0139758 A1 | 7/2004 | Kamiya et al. |
| 2004/0164594 A1 | 8/2004 | Stoewe et al. |
| 2004/0177622 A1 | 9/2004 | Harvie |
| 2004/0177876 A1 | 9/2004 | Hightower |
| 2004/0177877 A1 | 9/2004 | Hightower |
| 2004/0191060 A1 | 9/2004 | Chiu et al. |
| 2004/0195870 A1 | 10/2004 | Bohlender |
| 2004/0237541 A1 | 12/2004 | Murphy |
| 2004/0238022 A1 | 12/2004 | Hiller et al. |
| 2004/0255364 A1 | 12/2004 | Feher |
| 2004/0264009 A1 | 12/2004 | Hwang et al. |
| 2005/0000558 A1 | 1/2005 | Moriyama et al. |
| 2005/0011009 A1 | 1/2005 | Wu |
| 2005/0012204 A1 | 1/2005 | Strnad |
| 2005/0045702 A1 | 3/2005 | Freeman et al. |
| 2005/0056310 A1 | 3/2005 | Shikata et al. |
| 2005/0061497 A1 | 3/2005 | Amaral |
| 2005/0067862 A1 | 3/2005 | Iqbal et al. |
| 2005/0072165 A1 | 4/2005 | Bell |
| 2005/0076944 A1 | 4/2005 | Kanatzidis et al. |
| 2005/0078451 A1 | 4/2005 | Sauciuc et al. |
| 2005/0086739 A1 | 4/2005 | Wu |
| 2005/0121065 A1 | 6/2005 | Otey |
| 2005/0126184 A1 | 6/2005 | Cauchy |
| 2005/0139692 A1 | 6/2005 | Yamamoto |
| 2005/0140180 A1 | 6/2005 | Hesch |
| 2005/0143797 A1 | 6/2005 | Parish et al. |
| 2005/0145285 A1 | 7/2005 | Extrand |
| 2005/0161072 A1 | 7/2005 | Esser et al. |
| 2005/0173950 A1 | 8/2005 | Bajic et al. |
| 2005/0180113 A1 | 8/2005 | Shirakami et al. |
| 2005/0183763 A1 | 8/2005 | Christiansen |
| 2005/0193742 A1 | 9/2005 | Arnold |
| 2005/0200166 A1 | 9/2005 | Noh |
| 2005/0202774 A1 | 9/2005 | Lipke |
| 2005/0220167 A1 | 10/2005 | Kanai et al. |
| 2005/0251120 A1 | 11/2005 | Anderson et al. |
| 2005/0257532 A1 | 11/2005 | Ikeda et al. |
| 2005/0257545 A1 | 11/2005 | Ziehr et al. |
| 2005/0259394 A1 | 11/2005 | Lin |
| 2005/0268956 A1 | 12/2005 | Take |
| 2005/0278863 A1 | 12/2005 | Bahash et al. |
| 2005/0285438 A1 | 12/2005 | Ishima et al. |
| 2005/0288749 A1 | 12/2005 | Lachenbruch |
| 2006/0005548 A1 | 1/2006 | Ruckstuhl |
| 2006/0005944 A1 | 1/2006 | Wang et al. |
| 2006/0011152 A1 | 1/2006 | Hayes |
| 2006/0028182 A1 | 2/2006 | Yang et al. |
| 2006/0053529 A1 | 3/2006 | Feher |
| 2006/0059933 A1 | 3/2006 | Axakov et al. |
| 2006/0060344 A1 | 3/2006 | Esaki |
| 2006/0075758 A1 | 4/2006 | Rice et al. |
| 2006/0075760 A1 | 4/2006 | Im et al. |
| 2006/0078319 A1 | 4/2006 | Maran |
| 2006/0080778 A1 | 4/2006 | Chambers |
| 2006/0087160 A1 | 4/2006 | Dong et al. |
| 2006/0093896 A1 | 5/2006 | Hong et al. |
| 2006/0102224 A1 | 5/2006 | Chen et al. |
| 2006/0118158 A1 | 6/2006 | Zhang et al. |
| 2006/0123799 A1 | 6/2006 | Tateyama et al. |
| 2006/0124165 A1 | 6/2006 | Bierschenk et al. |

(56) References Cited

U.S. PATENT DOCUMENTS

| | | |
|---|---|---|
| 2006/0137099 A1 | 6/2006 | Feher |
| 2006/0150657 A1 | 7/2006 | Spurgeon et al. |
| 2006/0157102 A1 | 7/2006 | Nakajima et al. |
| 2006/0158011 A1 | 7/2006 | Marlovits et al. |
| 2006/0162074 A1 | 7/2006 | Bader |
| 2006/0162341 A1 | 7/2006 | Milazzo |
| 2006/0174633 A1 | 8/2006 | Beckley |
| 2006/0175877 A1 | 8/2006 | Alionte et al. |
| 2006/0188418 A1 | 8/2006 | Park et al. |
| 2006/0197363 A1 | 9/2006 | Lofy et al. |
| 2006/0200398 A1 | 9/2006 | Botton et al. |
| 2006/0201161 A1 | 9/2006 | Hirai et al. |
| 2006/0201162 A1 | 9/2006 | Hsieh |
| 2006/0213682 A1 | 9/2006 | Moon et al. |
| 2006/0214480 A1 | 9/2006 | Terech |
| 2006/0216582 A1 | 9/2006 | Lee et al. |
| 2006/0219699 A1 | 10/2006 | Geisel et al. |
| 2006/0225441 A1 | 10/2006 | Goenka et al. |
| 2006/0225773 A1 | 10/2006 | Venkatasubramanian et al. |
| 2006/0237166 A1 | 10/2006 | Otey et al. |
| 2006/0237730 A1 | 10/2006 | Abramov |
| 2006/0243317 A1 | 11/2006 | Venkatasubramanian |
| 2006/0244289 A1 | 11/2006 | Bedro |
| 2006/0254284 A1* | 11/2006 | Ito .................. B60N 2/5635 62/3.61 |
| 2006/0273646 A1 | 12/2006 | Comiskey et al. |
| 2006/0289051 A1 | 12/2006 | Niimi et al. |
| 2007/0000255 A1 | 1/2007 | Elliot et al. |
| 2007/0017666 A1 | 1/2007 | Goenka et al. |
| 2007/0035162 A1 | 2/2007 | Bier et al. |
| 2007/0040421 A1 | 2/2007 | Zuzga et al. |
| 2007/0056295 A1 | 3/2007 | De Vilbiss |
| 2007/0069554 A1 | 3/2007 | Comiskey et al. |
| 2007/0086757 A1 | 4/2007 | Feher |
| 2007/0089773 A1 | 4/2007 | Koester et al. |
| 2007/0095378 A1 | 5/2007 | Ito et al. |
| 2007/0095383 A1 | 5/2007 | Tajima |
| 2007/0101602 A1 | 5/2007 | Bae et al. |
| 2007/0101729 A1 | 5/2007 | Aoki et al. |
| 2007/0107450 A1 | 5/2007 | Sasao et al. |
| 2007/0138844 A1 | 6/2007 | Kim |
| 2007/0142883 A1 | 6/2007 | Quincy, III |
| 2007/0145808 A1 | 6/2007 | Minuth et al. |
| 2007/0157630 A1 | 7/2007 | Kadle et al. |
| 2007/0157631 A1 | 7/2007 | Huang et al. |
| 2007/0158981 A1 | 7/2007 | Almasi et al. |
| 2007/0163269 A1 | 7/2007 | Chung et al. |
| 2007/0190712 A1 | 8/2007 | Lin et al. |
| 2007/0193279 A1 | 8/2007 | Yoneno et al. |
| 2007/0193280 A1 | 8/2007 | Tuskiewicz et al. |
| 2007/0194668 A1 | 8/2007 | Teshima et al. |
| 2007/0200398 A1 | 8/2007 | Wolas et al. |
| 2007/0214956 A1 | 9/2007 | Carlson et al. |
| 2007/0220907 A1 | 9/2007 | Ehlers |
| 2007/0227158 A1 | 10/2007 | Kuchimachi |
| 2007/0234742 A1 | 10/2007 | Aoki et al. |
| 2007/0241592 A1 | 10/2007 | Giffin et al. |
| 2007/0251016 A1 | 11/2007 | Feher |
| 2007/0256722 A1 | 11/2007 | Kondoh |
| 2007/0261412 A1 | 11/2007 | Heine |
| 2007/0261413 A1 | 11/2007 | Hatamian et al. |
| 2007/0261548 A1 | 11/2007 | Vrzalik et al. |
| 2007/0262621 A1 | 11/2007 | Dong et al. |
| 2007/0272290 A1 | 11/2007 | Sims et al. |
| 2007/0296251 A1 | 12/2007 | Krobok et al. |
| 2008/0000025 A1 | 1/2008 | Feher |
| 2008/0000511 A1 | 1/2008 | Kuroyanagi et al. |
| 2008/0022694 A1 | 1/2008 | Anderson et al. |
| 2008/0023056 A1 | 1/2008 | Kambe et al. |
| 2008/0028536 A1 | 2/2008 | Hadden-Cook |
| 2008/0028768 A1 | 2/2008 | Goenka |
| 2008/0028769 A1 | 2/2008 | Goenka |
| 2008/0053108 A1 | 3/2008 | Wen |
| 2008/0053509 A1 | 3/2008 | Flitsch et al. |
| 2008/0077211 A1 | 3/2008 | Levinson et al. |
| 2008/0078186 A1 | 4/2008 | Cao |
| 2008/0084095 A1 | 4/2008 | Wolas |
| 2008/0087316 A1 | 4/2008 | Inaba et al. |
| 2008/0124234 A1 | 5/2008 | Echazarreta |
| 2008/0154518 A1 | 6/2008 | Manaka et al. |
| 2008/0155990 A1 | 7/2008 | Gupta et al. |
| 2008/0163916 A1 | 7/2008 | Tsuneoka et al. |
| 2008/0164733 A1 | 7/2008 | Giffin et al. |
| 2008/0166224 A1 | 7/2008 | Giffin et al. |
| 2008/0239675 A1 | 10/2008 | Speier |
| 2008/0245092 A1 | 10/2008 | Forsberg et al. |
| 2008/0263776 A1 | 10/2008 | O'Reagan |
| 2008/0268333 A1 | 10/2008 | Barrella et al. |
| 2008/0289677 A1 | 11/2008 | Bell et al. |
| 2008/0307796 A1 | 12/2008 | Bell et al. |
| 2008/0311466 A1 | 12/2008 | Yang et al. |
| 2009/0000031 A1 | 1/2009 | Feher |
| 2009/0015042 A1 | 1/2009 | Bargheer et al. |
| 2009/0026813 A1 | 1/2009 | Lofy |
| 2009/0031742 A1 | 2/2009 | Seo et al. |
| 2009/0033130 A1 | 2/2009 | Marquette et al. |
| 2009/0106907 A1 | 4/2009 | Chambers |
| 2009/0108094 A1 | 4/2009 | Ivri |
| 2009/0121524 A1 | 5/2009 | Abe et al. |
| 2009/0126110 A1 | 5/2009 | Feher |
| 2009/0151909 A1 | 6/2009 | Yang |
| 2009/0178700 A1 | 7/2009 | Heremans et al. |
| 2009/0203120 A1 | 8/2009 | Shin et al. |
| 2009/0211619 A1 | 8/2009 | Sharp et al. |
| 2009/0218855 A1 | 9/2009 | Wolas |
| 2009/0235969 A1 | 9/2009 | Heremans et al. |
| 2009/0250980 A1 | 10/2009 | Major et al. |
| 2009/0263242 A1 | 10/2009 | Winkler et al. |
| 2009/0269584 A1 | 10/2009 | Bell et al. |
| 2009/0293488 A1 | 12/2009 | Coughlan, III et al. |
| 2010/0031987 A1 | 2/2010 | Bell et al. |
| 2010/0101239 A1 | 4/2010 | LaGrandeur et al. |
| 2010/0104935 A1 | 4/2010 | Hermann et al. |
| 2010/0112419 A1 | 5/2010 | Jang et al. |
| 2010/0128439 A1 | 5/2010 | Tilak et al. |
| 2010/0132379 A1 | 6/2010 | Wu |
| 2010/0132380 A1 | 6/2010 | Robinson, II |
| 2010/0133883 A1 | 6/2010 | Walker |
| 2010/0153066 A1 | 6/2010 | Federer et al. |
| 2010/0154437 A1 | 6/2010 | Nepsha |
| 2010/0154911 A1 | 6/2010 | Yoskowitz |
| 2010/0155018 A1 | 6/2010 | Goenka et al. |
| 2010/0198322 A1 | 8/2010 | Joseph et al. |
| 2010/0243017 A1 | 9/2010 | Normann et al. |
| 2010/0243346 A1 | 9/2010 | Anderson et al. |
| 2010/0303647 A1 | 12/2010 | Ida et al. |
| 2010/0307168 A1 | 12/2010 | Kohl et al. |
| 2011/0017421 A1 | 1/2011 | Esaki |
| 2011/0061400 A1 | 3/2011 | Park et al. |
| 2011/0061401 A1 | 3/2011 | Jun et al. |
| 2011/0061403 A1 | 3/2011 | Jun et al. |
| 2011/0066217 A1 | 3/2011 | Diller et al. |
| 2011/0101741 A1 | 5/2011 | Kolich |
| 2011/0107773 A1 | 5/2011 | Gawthrop |
| 2011/0183178 A1 | 7/2011 | Sohn |
| 2011/0192173 A1 | 8/2011 | Walter et al. |
| 2011/0236731 A1 | 9/2011 | Bell et al. |
| 2011/0244300 A1 | 10/2011 | Closek et al. |
| 2011/0271994 A1 | 11/2011 | Gilley |
| 2011/0289684 A1 | 12/2011 | Parish et al. |
| 2012/0000901 A1 | 1/2012 | Bajic et al. |
| 2012/0003510 A1 | 1/2012 | Eisenhour |
| 2012/0017371 A1 | 1/2012 | Pollard |
| 2012/0080911 A1 | 4/2012 | Brykalski et al. |
| 2012/0129020 A1 | 5/2012 | Lachenmeier et al. |
| 2012/0132242 A1 | 5/2012 | Chu et al. |
| 2012/0144844 A1 | 6/2012 | Park et al. |
| 2012/0145215 A1 | 6/2012 | Hwang et al. |
| 2012/0174956 A1 | 7/2012 | Smythe et al. |
| 2012/0189902 A1 | 7/2012 | Kim |
| 2012/0198616 A1 | 8/2012 | Makansi et al. |
| 2012/0201008 A1 | 8/2012 | Hershberger et al. |
| 2012/0235444 A1 | 9/2012 | Dilley et al. |
| 2012/0239123 A1 | 9/2012 | Weber et al. |

(56) References Cited

U.S. PATENT DOCUMENTS

| | | |
|---|---|---|
| 2012/0244404 A1 | 9/2012 | Obasih et al. |
| 2012/0256451 A1 | 10/2012 | Sahashi |
| 2012/0261399 A1 | 10/2012 | Lofy |
| 2012/0266608 A1 | 10/2012 | Kadle et al. |
| 2012/0282497 A1 | 11/2012 | Yang et al. |
| 2012/0285758 A1 | 11/2012 | Bell et al. |
| 2012/0289761 A1 | 11/2012 | Boyden et al. |
| 2012/0325281 A1 | 12/2012 | Akiyama |
| 2013/0008181 A1 | 1/2013 | Makansi et al. |
| 2013/0028765 A1 | 1/2013 | Yokozawa et al. |
| 2013/0097777 A1 | 4/2013 | Marquette et al. |
| 2013/0108897 A1 | 5/2013 | Christian et al. |
| 2013/0125563 A1 | 5/2013 | Jun |
| 2013/0183566 A1 | 7/2013 | Wayne et al. |
| 2013/0192272 A1 | 8/2013 | Ranalli et al. |
| 2013/0200424 A1 | 8/2013 | An et al. |
| 2013/0207617 A1 | 8/2013 | Houchin-Miller et al. |
| 2013/0216887 A1 | 8/2013 | Wayne et al. |
| 2013/0232996 A1 | 9/2013 | Goenka et al. |
| 2013/0236753 A1 | 9/2013 | Yue et al. |
| 2013/0239592 A1 | 9/2013 | Lofy |
| 2013/0317728 A1 | 11/2013 | Hall et al. |
| 2014/0014871 A1 | 1/2014 | Haddon et al. |
| 2014/0023897 A1 | 1/2014 | Suga |
| 2014/0026320 A1 | 1/2014 | Marquette et al. |
| 2014/0030082 A1 | 1/2014 | Helmenstein |
| 2014/0030560 A1 | 1/2014 | Lev et al. |
| 2014/0090513 A1 | 4/2014 | Zhang et al. |
| 2014/0113536 A1 | 4/2014 | Goenka et al. |
| 2014/0124176 A1 | 5/2014 | Zhamu et al. |
| 2014/0131343 A1 | 5/2014 | Walsh |
| 2014/0137569 A1 | 5/2014 | Parish et al. |
| 2014/0159442 A1 | 6/2014 | Helmenstein |
| 2014/0165597 A1 | 6/2014 | Hernon et al. |
| 2014/0165608 A1 | 6/2014 | Tseng |
| 2014/0180493 A1 | 6/2014 | Csonti et al. |
| 2014/0182646 A1 | 7/2014 | Choi et al. |
| 2014/0187140 A1 | 7/2014 | Lazanja et al. |
| 2014/0194959 A1 | 7/2014 | Fries et al. |
| 2014/0230455 A1 | 8/2014 | Chandler et al. |
| 2014/0250918 A1 | 9/2014 | Lofy |
| 2014/0256244 A1 | 9/2014 | Sakurai et al. |
| 2014/0260331 A1 | 9/2014 | Lofy et al. |
| 2014/0305153 A1 | 10/2014 | Arai |
| 2014/0305625 A1 | 10/2014 | Petrovski |
| 2014/0338366 A1 | 11/2014 | Adldinger et al. |
| 2015/0033764 A1 | 2/2015 | Gurevich et al. |
| 2015/0101353 A1 | 4/2015 | Oh et al. |
| 2015/0101354 A1 | 4/2015 | Oh et al. |
| 2015/0101355 A1 | 4/2015 | Oh et al. |
| 2015/0116943 A1 | 4/2015 | Olsson et al. |
| 2015/0118482 A1 | 4/2015 | Kagawa |
| 2015/0165865 A1 | 6/2015 | Park et al. |
| 2015/0171489 A1 | 6/2015 | Inaba et al. |
| 2015/0231636 A1 | 8/2015 | Lim et al. |
| 2015/0238020 A1 | 8/2015 | Petrovski et al. |
| 2015/0298524 A1 | 10/2015 | Goenka |
| 2016/0030234 A1 | 2/2016 | Lofy et al. |
| 2016/0035957 A1 | 2/2016 | Casey |
| 2016/0039321 A1 | 2/2016 | Dacosta-Mallet et al. |
| 2016/0133817 A1 | 5/2016 | Makansi et al. |
| 2016/0190660 A1 | 6/2016 | Yue et al. |
| 2016/0325657 A1 | 11/2016 | Zhang et al. |
| 2017/0047500 A1 | 2/2017 | Shiraishi et al. |
| 2017/0066355 A1 | 3/2017 | Kozlowski |
| 2017/0071359 A1 | 3/2017 | Petrovski et al. |
| 2017/0200992 A1 | 7/2017 | Piggott et al. |
| 2017/0268803 A1 | 9/2017 | Cauchy |
| 2017/0294692 A1 | 10/2017 | Bell et al. |
| 2017/0365764 A1 | 12/2017 | Shingai et al. |
| 2018/0111527 A1 | 4/2018 | Tait et al. |
| 2018/0123013 A1 | 5/2018 | Williams et al. |
| 2018/0170223 A1 | 6/2018 | Wolas |
| 2018/0172325 A1 | 6/2018 | Inaba et al. |
| 2018/0279416 A1 | 9/2018 | Sajic et al. |
| 2018/0290574 A1 | 10/2018 | Kozlowski |
| 2019/0051807 A1 | 2/2019 | Okumura et al. |
| 2019/0086133 A1 | 3/2019 | Popli et al. |
| 2019/0268975 A1 | 8/2019 | Kim |
| 2019/0331380 A1 | 10/2019 | Seiler et al. |
| 2020/0035898 A1 | 1/2020 | Jovovic et al. |
| 2021/0370746 A1 | 12/2021 | Pacilli et al. |
| 2022/0169158 A1 | 6/2022 | Cauchy |
| 2022/0381262 A1 | 12/2022 | Lofy et al. |
| 2024/0123791 A1 | 4/2024 | Turner et al. |
| 2024/0140165 A1 | 5/2024 | Chewter et al. |
| 2024/0288005 A1 | 8/2024 | Lofy et al. |

FOREIGN PATENT DOCUMENTS

| | | | |
|---|---|---|---|
| CN | 2155318 | 2/1994 | |
| CN | 1094500 | 11/1994 | |
| CN | 1195090 | 10/1998 | |
| CN | 1299950 | 6/2001 | |
| CN | 1320087 | 10/2001 | |
| CN | 1513699 | 7/2004 | |
| CN | 1535220 | 10/2004 | |
| CN | 1753242 | 3/2006 | |
| CN | 1929761 | 3/2007 | |
| CN | 101 033 878 | 9/2007 | |
| CN | 101 097 986 | 1/2008 | |
| CN | 101 219 025 | 7/2008 | |
| CN | 100 446 339 | 12/2008 | |
| CN | 101 332 785 | 12/2008 | |
| CN | 101 517 496 | 8/2009 | |
| CN | 101 662 054 | 3/2010 | |
| CN | 101 667 568 | 3/2010 | |
| CN | 101 720 414 | 6/2010 | |
| CN | 102 019 866 | 4/2011 | |
| CN | 202 094 248 | 12/2011 | |
| CN | 102 769 157 | 11/2012 | |
| CN | 102 801 105 | 11/2012 | |
| CN | 103 050 742 | 4/2013 | |
| CN | 104 282 643 | 1/2015 | |
| CN | 204 157 198 | 2/2015 | |
| CN | 106 030 989 | 10/2016 | |
| CN | 106 937 799 | 7/2017 | |
| CN | 108 778 802 | 11/2018 | |
| CN | 108778802 A * | 11/2018 | ............... B60H 1/32 |
| CN | 208 355 060 | 1/2019 | |
| CN | 111 306 838 | 6/2020 | |
| CZ | 288460 | 6/2001 | |
| DE | 13 01 454 | 8/1969 | |
| DE | 23 19 155 | 10/1974 | |
| DE | 195 03 291 | 8/1996 | |
| DE | 197 30 678 | 1/1999 | |
| DE | 198 29 440 | 1/2000 | |
| DE | 199 12 764 | 9/2000 | |
| DE | 299 11 519 | 11/2000 | |
| DE | 199 51 224 | 5/2001 | |
| DE | 102 38 552 | 8/2001 | |
| DE | 201 05 487 | 10/2001 | |
| DE | 101 15 242 | 10/2002 | |
| DE | 202 17 645 | 3/2003 | |
| DE | 201 20 516 | 4/2003 | |
| DE | 10 2008 013850 | 10/2009 | |
| DE | 10 2010 011 668 | 12/2010 | |
| DE | 10 2009 036 332 | 2/2011 | |
| DE | 10 2010 028 728 | 11/2011 | |
| DE | 10 2010 022 908 | 12/2011 | |
| DE | 10 2009 003 737 | 12/2012 | |
| DE | 10 2012 219 747 | 5/2013 | |
| DE | 21 2012 000 139 U1 | 4/2014 | |
| DE | 10 2018 203 701 | 9/2018 | |
| EP | 0 389 407 | 9/1990 | |
| EP | 0 424 160 | 4/1991 | |
| EP | 0 545 021 | 6/1993 | |
| EP | 0 411 375 | 5/1994 | |
| EP | 0 621 026 | 10/1994 | |
| EP | 0 791 497 | 8/1997 | |
| EP | 0 834 421 | 4/1998 | |
| EP | 0 862 901 | 9/1998 | |
| EP | 0 878 851 | 11/1998 | |
| EP | 1 486 143 | 12/2004 | |

(56) References Cited

FOREIGN PATENT DOCUMENTS

| | | |
|---|---|---|
| EP | 1 598 223 | 11/2005 |
| EP | 1 641 067 | 3/2006 |
| EP | 1 932 695 | 6/2008 |
| EP | 1 972 312 | 9/2008 |
| EP | 1 845 914 | 9/2009 |
| EP | 2 098 733 | 9/2009 |
| EP | 2 565 977 | 3/2013 |
| EP | 2 396 619 | 8/2015 |
| EP | 2 921 083 | 9/2015 |
| FR | 2 806 666 | 9/2001 |
| FR | 2 882 307 | 8/2006 |
| FR | 2 893 826 | 6/2007 |
| FR | 2 903 057 | 1/2008 |
| GB | 231192 | 5/1926 |
| GB | 874660 | 8/1961 |
| GB | 978057 | 12/1964 |
| GB | 1 040 485 | 8/1966 |
| GB | 1 435 831 | 5/1976 |
| GB | 2 267 338 | 12/1993 |
| GB | 2 333 352 | 7/1999 |
| JP | 39-027735 | 12/1964 |
| JP | 56-018231 | 2/1981 |
| JP | 56-097416 | 8/1981 |
| JP | 60-080044 | 5/1985 |
| JP | 60-085297 | 5/1985 |
| JP | 01-131830 | 5/1989 |
| JP | 01-200122 | 8/1989 |
| JP | 01-281344 | 11/1989 |
| JP | 04-052470 | 6/1990 |
| JP | 04-103925 | 4/1992 |
| JP | 04-165234 | 6/1992 |
| JP | 05-006687 | 1/1993 |
| JP | 05-026762 | 2/1993 |
| JP | 05-069731 A | 3/1993 |
| JP | 05-037521 U | 5/1993 |
| JP | 05-147423 | 6/1993 |
| JP | 05-277020 | 10/1993 |
| JP | 06-024235 | 2/1994 |
| JP | 06-089955 | 3/1994 |
| JP | 06-135218 | 5/1994 |
| JP | 06-207771 | 7/1994 |
| JP | 07-089334 | 4/1995 |
| JP | 07-054189 | 6/1995 |
| JP | 07-253224 | 10/1995 |
| JP | 08-037322 | 2/1996 |
| JP | 08-316388 | 11/1996 |
| JP | 09-042801 | 2/1997 |
| JP | 09-254630 | 9/1997 |
| JP | 09-276076 | 10/1997 |
| JP | 10-035268 | 2/1998 |
| JP | 10-044756 | 2/1998 |
| JP | 10-092394 | 4/1998 |
| JP | 10-227508 | 8/1998 |
| JP | 10-297243 | 11/1998 |
| JP | 10-297274 | 11/1998 |
| JP | 10-332883 | 12/1998 |
| JP | 11-032492 | 2/1999 |
| JP | 11-042933 | 2/1999 |
| JP | 11-301254 | 11/1999 |
| JP | 11-342731 | 12/1999 |
| JP | 2000-060681 | 2/2000 |
| JP | 2000-130883 | 5/2000 |
| JP | 2000-161721 | 6/2000 |
| JP | 2000-164945 | 6/2000 |
| JP | 2000-244024 | 9/2000 |
| JP | 2000-274788 | 10/2000 |
| JP | 2000-274871 | 10/2000 |
| JP | 2000-274874 | 10/2000 |
| JP | 2000-318434 | 11/2000 |
| JP | 2000-325384 | 11/2000 |
| JP | 2001-174028 | 6/2001 |
| JP | 2001-208405 | 8/2001 |
| JP | 2002-013758 | 1/2002 |
| JP | 2002-059736 | 2/2002 |
| JP | 2002-514735 | 5/2002 |
| JP | 2002-227798 | 8/2002 |
| JP | 2002-234332 | 8/2002 |
| JP | 2003-007356 | 1/2003 |
| JP | 2003-042594 | 2/2003 |
| JP | 2003-174203 | 6/2003 |
| JP | 2003-204087 | 7/2003 |
| JP | 2003-217735 | 7/2003 |
| JP | 2003-237357 | 8/2003 |
| JP | 2003-254636 | 9/2003 |
| JP | 2004-017855 | 1/2004 |
| JP | 2004-050874 | 2/2004 |
| JP | 2004-055621 | 2/2004 |
| JP | 2004-079883 | 3/2004 |
| JP | 2004-174138 | 6/2004 |
| JP | 2005-079210 | 2/2005 |
| JP | 2005-057006 | 3/2005 |
| JP | 2005-116839 | 4/2005 |
| JP | 2005-212564 | 8/2005 |
| JP | 2005-228954 | 8/2005 |
| JP | 2005-251950 | 9/2005 |
| JP | 2005-302851 | 10/2005 |
| JP | 2005-303183 | 10/2005 |
| JP | 2005-333083 | 12/2005 |
| JP | 2006-001392 | 1/2006 |
| JP | 2006-015965 | 1/2006 |
| JP | 2006-021572 | 1/2006 |
| JP | 2006-069376 | 3/2006 |
| JP | 2006-076398 | 3/2006 |
| JP | 2006-093526 | 4/2006 |
| JP | 2006-123874 | 5/2006 |
| JP | 2006-127920 | 5/2006 |
| JP | 2006-278327 | 10/2006 |
| JP | 2006-341841 | 12/2006 |
| JP | 2007-506523 | 3/2007 |
| JP | 2007-506526 | 3/2007 |
| JP | 2007-126047 | 5/2007 |
| JP | 2007-161110 | 6/2007 |
| JP | 2007-240046 | 9/2007 |
| JP | 2008-012498 | 1/2008 |
| JP | 2008-047371 | 2/2008 |
| JP | 2008-091183 | 4/2008 |
| JP | 2008-094366 | 4/2008 |
| JP | 2008-108509 | 5/2008 |
| JP | 2008-166292 | 7/2008 |
| JP | 2008-529894 | 8/2008 |
| JP | 2008-218352 | 9/2008 |
| JP | 2008-226617 | 9/2008 |
| JP | 2008-274790 | 11/2008 |
| JP | 2009-010138 | 1/2009 |
| JP | 2009-077760 | 4/2009 |
| JP | 2009-170259 | 7/2009 |
| JP | 2009-181853 | 8/2009 |
| JP | 2009-245730 | 10/2009 |
| JP | 2009-289429 | 12/2009 |
| JP | 2009-302054 | 12/2009 |
| JP | 2010-000253 | 1/2010 |
| JP | 2010-052494 | 3/2010 |
| JP | 2010-108932 | 5/2010 |
| JP | 2010-113861 | 5/2010 |
| JP | 2010-192207 | 9/2010 |
| JP | 2010-198930 | 9/2010 |
| JP | 2011-023180 | 2/2011 |
| JP | 2011-189764 | 9/2011 |
| JP | 2012-079553 | 4/2012 |
| JP | 2012-512504 | 5/2012 |
| JP | 2012-124319 | 6/2012 |
| JP | 2012-516007 | 7/2012 |
| JP | 2012-156131 | 8/2012 |
| JP | 2012-174496 | 9/2012 |
| JP | 2012-216422 | 11/2012 |
| JP | 2012-216423 | 11/2012 |
| JP | 2012-234749 | 11/2012 |
| JP | 2013-077432 | 4/2013 |
| JP | 2013-184588 | 9/2013 |
| JP | 2013-203196 | 10/2013 |
| JP | 2013-211436 | 10/2013 |
| JP | 2014-135455 | 7/2014 |
| JP | 2016-540344 | 12/2016 |
| JP | 2017-518912 | 7/2017 |

(56) References Cited

FOREIGN PATENT DOCUMENTS

| | | |
|---|---|---|
| JP | 2017-171129 | 9/2017 |
| JP | 2018-012498 | 1/2018 |
| KR | 10-2001-0060500 | 7/2001 |
| KR | 2001-111646 | 12/2001 |
| KR | 10-2002-0057600 | 7/2002 |
| KR | 10-2003-0082589 | 10/2003 |
| KR | 10-2005-0011494 | 1/2005 |
| KR | 10-2005-0018184 | 2/2005 |
| KR | 10-2008-0090162 | 10/2008 |
| KR | 10-2009-0043712 | 5/2009 |
| KR | 10-2011-0013876 | 2/2011 |
| KR | 10-2011-0100263 | 9/2011 |
| KR | 10-2011-0128639 | 11/2011 |
| KR | 10-2011-0134960 A | 12/2011 |
| KR | 10-2012-0053476 | 5/2012 |
| KR | 10-2012-0062314 | 6/2012 |
| KR | 10-2012-0100237 | 9/2012 |
| KR | 10-1524090 | 5/2015 |
| KR | 10-1721256 B1 | 3/2017 |
| KR | 10-1873857 | 7/2018 |
| LU | 66619 | 2/1973 |
| RU | 2562507 | 9/2015 |
| SE | 337 227 | 5/1971 |
| SU | 184886 | 7/1966 |
| TW | 200524519 | 7/2005 |
| WO | WO 94/20801 | 9/1994 |
| WO | WO 95/01500 | 1/1995 |
| WO | WO 95/14899 | 6/1995 |
| WO | WO 95/31688 | 11/1995 |
| WO | WO 96/05475 | 2/1996 |
| WO | WO 97/47930 | 12/1997 |
| WO | WO 98/07898 | 2/1998 |
| WO | WO 98/31311 | 7/1998 |
| WO | WO 99/09360 | 2/1999 |
| WO | WO 99/10191 | 3/1999 |
| WO | WO 99/23980 | 5/1999 |
| WO | WO 99/44552 | 9/1999 |
| WO | WO 99/58907 | 11/1999 |
| WO | WO 02/00458 | 1/2002 |
| WO | WO 02/11968 | 2/2002 |
| WO | WO 02/053400 | 7/2002 |
| WO | WO 02/058165 | 7/2002 |
| WO | WO 03/014634 | 2/2003 |
| WO | WO 03/051666 | 6/2003 |
| WO | WO 03/063257 | 7/2003 |
| WO | WO 2004/011861 | 2/2004 |
| WO | WO 2005/023571 | 3/2005 |
| WO | WO 2005/038860 | 4/2005 |
| WO | WO 2005/065987 | 7/2005 |
| WO | WO 2005/073021 | 8/2005 |
| WO | WO 2005/105516 | 11/2005 |
| WO | WO 2005/115794 | 12/2005 |
| WO | WO 2006/037178 | 4/2006 |
| WO | WO 2006/041935 | 4/2006 |
| WO | WO 2006/064432 | 6/2006 |
| WO | WO 2006/078394 | 7/2006 |
| WO | WO 2006/102509 | 9/2006 |
| WO | WO 2006/117690 | 11/2006 |
| WO | WO 2007/001289 | 1/2007 |
| WO | WO 2007/060371 | 5/2007 |
| WO | WO 2007/089789 | 8/2007 |
| WO | WO 2008/023942 | 2/2008 |
| WO | WO 2008/045964 | 4/2008 |
| WO | WO 2008/046110 | 4/2008 |
| WO | WO 2008/057962 | 5/2008 |
| WO | WO 2008/076588 | 6/2008 |
| WO | WO 2008/086499 | 7/2008 |
| WO | WO 2008/115831 | 9/2008 |
| WO | WO 2008/123663 | 10/2008 |
| WO | WO 2008/147305 | 12/2008 |
| WO | WO 2009/015235 | 1/2009 |
| WO | WO 2009/036077 | 3/2009 |
| WO | WO 2009/053858 | 4/2009 |
| WO | WO 2009/097572 | 8/2009 |
| WO | WO 2009/112185 | 9/2009 |
| WO | WO 2010/009422 | 1/2010 |
| WO | WO 2010/071463 | 6/2010 |
| WO | WO 2010/088405 | 8/2010 |
| WO | WO 2010/129803 | 11/2010 |
| WO | WO 2010/135371 | 11/2010 |
| WO | WO 2011/026040 | 3/2011 |
| WO | WO 2011/156643 | 12/2011 |
| WO | WO 2012/023249 | 2/2012 |
| WO | WO 2012/061777 | 5/2012 |
| WO | WO 2012/113930 | 8/2012 |
| WO | WO 2012/137289 | 10/2012 |
| WO | WO 2013/029744 | 3/2013 |
| WO | WO 2013/052823 | 4/2013 |
| WO | WO 2013/151903 | 10/2013 |
| WO | WO 2014/110524 | 7/2014 |
| WO | WO 2014/120688 | 8/2014 |
| WO | WO 2014/134369 | 9/2014 |
| WO | WO 2014/164887 | 10/2014 |
| WO | WO 2015/066079 | 5/2015 |
| WO | WO 2015/171901 | 11/2015 |
| WO | WO 2016/040872 | 3/2016 |
| WO | WO 2016/077843 | 5/2016 |
| WO | WO 2017/059256 | 4/2017 |
| WO | WO 2017/066261 | 4/2017 |
| WO | WO 2017/083308 | 5/2017 |
| WO | WO 2017/086043 | 5/2017 |
| WO | WO 2017/100718 | 6/2017 |
| WO | WO 2017/136793 | 8/2017 |
| WO | WO 2017/145630 | 8/2017 |
| WO | WO 2017/163580 | 9/2017 |
| WO | WO 2018/175506 | 9/2018 |
| WO | WO 2019/173553 | 9/2019 |
| WO | WO 2019/226968 | 11/2019 |
| WO | WO 2020/112902 | 6/2020 |
| WO | WO 2020/172255 | 8/2020 |
| WO | WO 2020/180632 | 9/2020 |
| WO | WO 2021/025663 | 2/2021 |
| WO | WO 2022/198216 | 9/2022 |
| WO | WO 2022/198217 | 9/2022 |

OTHER PUBLICATIONS

U.S. Appl. No. 15/685,912, filed Aug. 24, 2017, Petrovski et al.
U.S. Appl. No. 16/277,765, filed Feb. 15, 2019, Petrovski et al.
U.S. Appl. No. 16/355,550, filed Mar. 15, 2019, Kossakovski et al.
U.S. Appl. No. 16/459,289, filed Jul. 1, 2019, Kossakovski et al.
U.S. Appl. No. 18/310,474, filed May 1, 2023, Cauchy.
Behr, "Li-on Battery Cooling", Power Point Presentation, Stuttgart, May 20, 2009, 13 pages.
Behr, "Thermal Management for Hybrid Vehicles", Power Point Presentation, Technical Press Day 2009, 20 pages.
Chacko, S. et al., "Thermal modelling of Li-ion polymer battery for electric vehicle drive cycles", Journal of Power Sources, vol. 213, Sep. 2012, pp. 296-303.
Esfahanian, V. et al., "Design and Simulation of Air Cooled Battery Thermal Management System Using Thermoelectric for a Hybrid Electric Bus", Proceedings of the FISITA 2012 World Automotive Congress, vol. 3, Lecture notes in Electrical Engineering, vol. 191, 2013.
Feher, S., "Thermoelectric Air Conditioned Variable Temperature Seat (VTS) & Effect Upon Vehicle Occupant Comfort, Vehicle Energy Efficiency, and Vehicle Environment Compatibility", SAE Technical Paper, Apr. 1993, pp. 341-349.
Geng, S. et al., *Modern Family Practical Encyclopedia*, Jilin Science and Technology Press, Sep. 1985, p. 679.
Heckenberger, T., "Li-on Battery Cooling," BEHR Power Point Presentation, Technical Press Day, Stuttgart, May 20, 2009, 13 pages.
Horie, H. et al., "A Study on an Advanced Lithium-ion Battery System for EVs", The World Electric Vehicle Journal, 2008, vol. 2, Issue 2, pp. 25-31.
Jeon, Y. et al., "Development of Battery Pack Design for High Power Li-Ion Battery Pack of HEV", The World Electric Vehicle Association Journal, 2007, vol. 1, pp. 94-99.
Jeon, D. et al., "Thermal modeling of cylindrical lithium ion battery during discharge cycle," Energy Conversion and Management, Aug. 2011, vol. 52, Issues 8-9, pp. 2973-2981.

(56) References Cited

OTHER PUBLICATIONS

Lofy, J., et al., "Thermoelectrics for Environmental Control in Automobiles", Proceeding of Twenty-First International Conference on Thermoelectrics (ICT 2002), 2002, pp. 471-476.

Luo, Z., "A Simple Method to Estimate the Physical Characteristics of a Thermoelectric Cooler from Vendor Datasheets", Electronics Cooling, Aug. 2008, in 17 pages from https://www.electronics-cooling.com/2008/08/a-simple-method-to-estimate-the-physical-characteristics-of-a-thermoelectric-cooler-from-vendor-datasheets/.

Morawietz, L. et al., "Thermoelektrische Modellierung eines Lithium-Lonen-Energiespeichers fuer denFahrzeugeinsatz," VDI-Berichte, Nov. 2008, Issue 2030, pp. 299-318, along with its English translation.

Photographs and accompanying description of climate control seat assembly system components publicly disclosed as early as Jan. 1998.

Photographs and accompanying description of a component of a climate control seat assembly system sold prior to Nov. 1, 2005.

Photographs and accompanying description of a component of a climate control seat assembly system sold prior to Dec. 20, 2003.

Sabbah, R. et al., "Passive Thermal Management System for Plug-in Hybrid and Comparison with Active Cooling: Limitation of Temperature Rise and Uniformity of Temperature Distribution," ECS Transactions, The Electrochemical Society, 2008, 13 (19) pp. 41-52.

Solbrekken, G. et al., "Thermal management of portable electronic equipment using thermoelectric energy conversion", The Ninth Intersociety Conference on Thermal and Thermomechanical Phenomena in Electronic Systems (IEEE Cat. No. 04CH37543), 2004, vol. 1, pp. 276-283.

Wu, Z., "Research on Performance for Typical Hybrid Electric Vehicles based on Energy Usage Ratio", China Master's Theses Full-text Database, Engineering Science and Technology II, May 2012, Issue 1, (Master's dissertation; South China University of Technology) along with an English abstract in 122 pages.

Zhou, Z. et al., "Design features of the air-conditioner used for elevators and a comparison betweentechniques for eliminating condensation water", Energy Research and Information, 2002, vol. 18, No. 3, pp. 156-161.

Decision to Grant a Patent dated Jan. 28, 2014 issued in Japanese Application No. 2012-511976, along with the allowed claims and corresponding English translations.

Chinese Office Action in Chinese Application No. 201811430679.2, dated Nov. 26, 2021.

Invitation to Pay Additional Fees received in PCT Application No. PCT/US2019/063445, dated Jan. 27, 2020.

International Search Report and Written Opinion received in PCT Application No. PCT/US2019/063445, dated Mar. 25, 2020.

International Preliminary Report on Patentability received in PCT Application No. PCT/US2019/063445, dated Jun. 10, 2021.

International Search Report and Written Opinion received in PCT Application No. PCT/US2010/0353321, dated Dec. 23, 2010.

International Preliminary Report on Patentability received in PCT Application No. PCT/US2010/0353321, dated Nov. 22, 2011.

\* cited by examiner

Main Opening 0%

Main Opening 100%

THERMOELECTRIC CONDITIONING SYSTEM AND METHODS

CROSS-REFERENCE TO RELATED APPLICATIONS

This application is a continuation of U.S. application Ser. No. 17/309,456, filed May 27, 2021, which is a 371 of international PCT Application No. PCT/US2019/063445, filed Nov. 26, 2019, which claims priority to U.S. Provisional Application No. 62/773,961, filed Nov. 30, 2018, which is hereby incorporated herein by reference in its entirety for all purposes and are to be considered a part of this specification.

BACKGROUND

Field

This disclosure generally relates to climate control, and, more particularly, to a climate control system.

Related Art

Temperature modified air for environmental control of living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modification is desirable. For example, it is often desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Furthermore, even with normal air-conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely to warm the vehicle's interior as quickly.

For such reasons, there have been various types of individualized climate control systems for vehicle seats and other climate-controlled environments. In such systems, a thermal conditioning system can thermally condition the air and delivers the conditioned air into the environment to cool or heat the space.

SUMMARY

A system for thermally conditionings and moving a fluid, includes a thermoelectric device to convert electrical energy into thermal energy to produce a temperature change in response to an electrical current being applied thereto. The thermoelectric device has a main-side and a waste side. A fluid moving device produces a fluid flow that is in thermal communication with the thermoelectric device so that the thermal energy generated by the thermoelectric device is transferred to or from the fluid flow. A flow control valve selectively directs the fluid flow along a main-side fluid flow path and/or a waste side fluid flow path.

In another aspect, a control unit operatively connects with a fluid moving device and the flow control valve operates the fluid moving device and the flow control valve.

In another aspect, a sensor provides a signal that is indicative of a temperature of the fluid flow.

In another aspect, the control unit operates the flow control valve based on the signal.

In another aspect, the control unit adjusts the flow control valve and approximately equal proportions of the fluid flow are directed to the waste side fluid flow path and the main-side fluid flow path.

In another aspect, the control unit adjusts a flow control valve position based on a desired main-side temperature.

In another aspect, the control unit lowers the main-side temperature and/or increases a temperature differential between the main-side and the waste side by adjusts the flow control valve to direct more of the fluid flow to the waste side fluid flow path than to the main-side fluid flow path.

In another aspect, the flow control valve is adjusted from a fully open position towards a fully closed position.

In another aspect, the control unit adjusts the flow control valve wherein less than 20% of a total volume of the fluid flow on the main-side and waste-side paths is directed to the main-side fluid flow path to achieve a high temperature differential between the main-side and the waste side of the thermoelectric device.

In another aspect, the control unit adjusts a proportion of the fluid flow directed to the main-side fluid flow path to prevent condensation in the fluid flow.

In another aspect, the control unit adjusts the fluid flow provided by the fluid moving device based on a position of the flow control valve.

In another aspect, the control unit increases the fluid flow when the fluid flow is proportioned towards the main-side fluid flow path.

In another aspect, the control unit maintains the fluid flow by lowering a speed of the fluid moving device when the position of the flow control valve is increases backpressure on the fluid moving device, such as by lowering a voltage applied to the fluid moving device.

In another aspect, the control unit adjusts a proportion of the fluid flow directed to the main-side fluid flow path based on cabin environment wettedness.

In another aspect, the control unit adjusts a conditioned air temperature by adjusts a proportion of the fluid flow along the main-side fluid flow path and a bypass flow path and blends cooler air from the main-side fluid flow path with warmer air from the bypass flow path to create the conditioned air at an intermediate temperature.

In another aspect, the control unit directs more of the fluid flow to the main-side fluid flow path than the waste side fluid flow path to prevent condensation in the fluid flow and to increase cools capacity of the system at a limited temperature differential between the main-side and the waste side of the thermoelectric device.

In another aspect, the control unit directs a first proportion of the fluid flow to the main-side fluid flow path for a first time period and a second proportion of the fluid flow to the main-side fluid flow path for a second time period, the first time period set to form an acceptable amount of condensation in fluid flow.

In another aspect, the first and/or second time periods are set to maintain a pre-set temperature differential between the main-side and the waste side of the thermoelectric device.

In another aspect, the control unit directs substantially all of the fluid flow along the main-side fluid flow path to provide a high ventilation rate.

In another aspect, the control unit operates the thermoelectric device as a heater and direct substantially all or most of the fluid flow along the main-side fluid flow path to increase heats capacity and avoid losses associated with heat removal and air flow on the waste side of the thermoelectric device.

In another aspect, the control unit adjusts the flow control valve position based on a cabin air temperature and humidity.

A control method claim for a thermal conditioning system includes powering a TED of the thermal conditioning system has a main side and a waste side, the thermal conditioning system operates in a first mode for a first period in which a fluid flow passes through the thermal conditioning system. A first portion of the fluid flow is directed through the waste side at a first flow rate and a second portion of the fluid flow is directed through the main side at a second flow rate. The thermal conditioning system operates in a second mode for a second period in which a ratio between the first flow rate and the second flow rate is changed as compared to the first mode.

In another aspect, the first mode is an initial mode.

In another aspect, a target temperature of the fluid flow is detected using a temperature sensor and operation changes from the first mode to the second mode based on detecting the target temperature.

In another aspect, the target temperature is detected on the main side.

In another aspect, a temperature differential between the main side and the waste side is measured and operation changes from the first mode to the second mode based on detecting the measured temperature differential.

In another aspect, condensation on the main side is detected that changes operation from the first mode to the second mode based on detecting the condensation.

In another aspect, in the second mode, the ratio between the first flow rate through the waste side and the second flow rate through the main side is decreased relative to the first mode.

In another aspect, in the second mode the first flow rate through the waste side and the second flow rate through the main side are approximately equal.

In another aspect, in the second mode the first flow rate that passes through the waste side is less than the second flow rate through the main side.

In another aspect, the thermal conditioning system operates in a third mode for a third period in which at least one of a total fluid flow through the thermal conditioning system and the power to the TED is decreased relative to the second mode.

In another aspect, the fluid flow between the main side and the waste side is directed with a valve.

A thermal conditioning system, includes a TED with a main side and a waste side, a main-side path along the main side of the TED and a waste-side path along the waste side of the TED. A controller operates the thermal conditioning system in a first mode for a first period in which a first fluid flow passes along the waste-side path at a first flow rate and a second fluid flow passes along the main-side path at a second flow rate and in a second mode for a second period in which a ratio between the first flow rate and the second flow rate is changed.

In another aspect, a valve directs the first and second fluid flows between the main-side path and the waste-side path. The controller operates the valve to change between the first and second modes.

In another aspect, wherein the first mode is an initial mode.

In another aspect, a temperature sensor detects a temperature of the second fluid flow. The controller further receives a signal from the temperature sensor and change operation from the first mode to the second mode based on the signal.

In another aspect, a temperature sensor detects a differential temperature between the first and second fluid flows. The controller receives a signal from the temperature sensor and changes operation from the first mode to the second mode based on the signal.

In another aspect, a humidity sensor detects a humidity of the second fluid flow. The controller receives a signal from the humidity sensor and changes operation from the first mode to the second mode based on the signal.

In another aspect, the first and second flow rates are approximately equal in the second mode.

In another aspect, the second flow rate is greater than the first flow rate in the second mode.

In another aspect, the controller operates the thermal conditioning system in a third mode for a third period in which at least one of the fluid flow through the thermal conditioning and the power to the TED is decreased relative to the second mode.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

Figure 1:
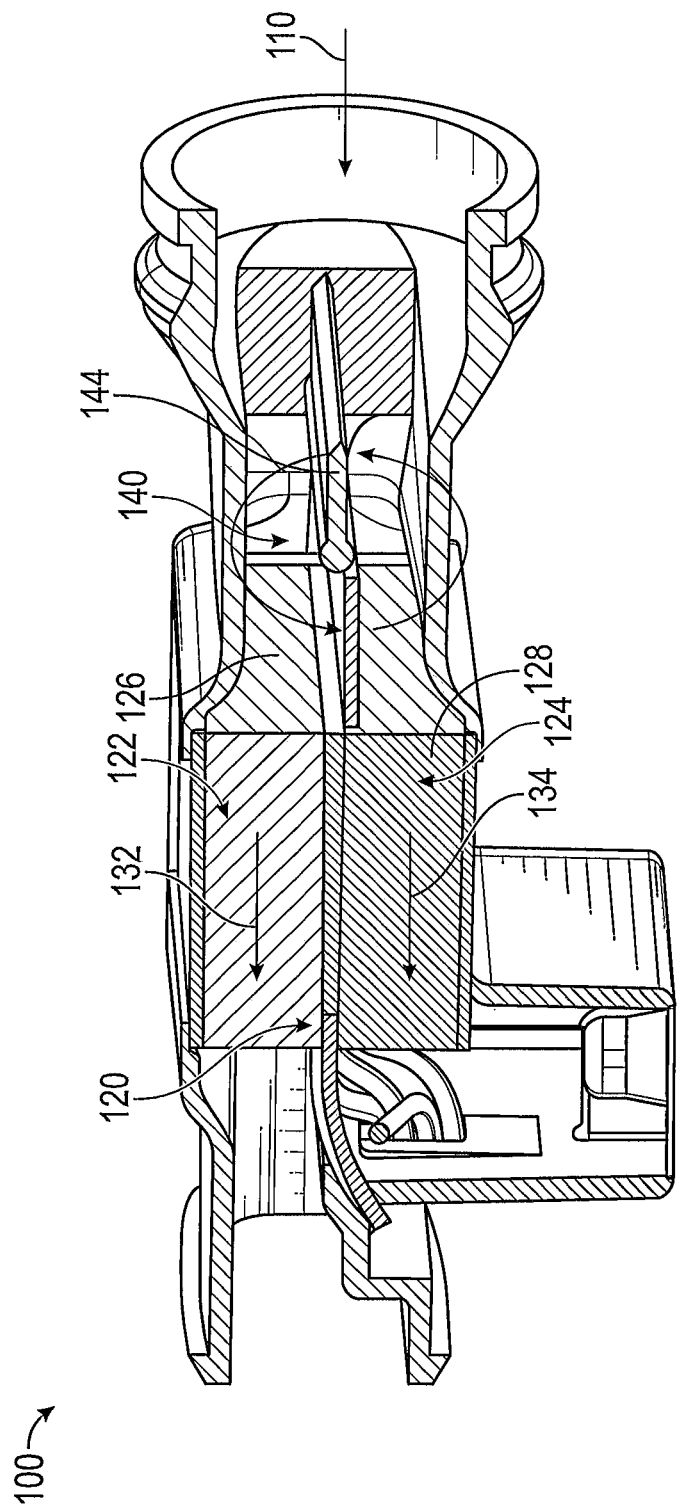
FIG. 1 shows a thermal conditioning system including a flow control valve for directing a fluid flow along a main-side path and a waste side path.

FIG. 1 shows an implementation of a thermal conditioning system 100. The thermal conditioning system 100 can be used to deliver conditioned (e.g., heated, cooled, dried, and/or wetted) air to a climate-controlled device or environment. In an exemplary implementation, the thermal conditioning system 100 can deliver conditioned air into a vehicle seat, such as through one or more passages or channels within the vehicle seat. The thermal conditioning system 100 can also be used to provide conditioned air to various other spaces or components such as an enclosed space, a bed, space, and/or sofa.

The thermal conditioning system 100 can include or be used in combination with a fluid moving device (not shown). The fluid moving device can be a fan, blower, or similar device. The fluid moving device can include a motor for driving one or more blades. A speed of the fluid moving device can controlled based on application of a voltage and/or amperage to the motor. The fluid moving device can deliver a fluid flow through the thermal conditioning system 100. The fluid flow, or a portion thereof, can be conditioned by passing through the thermal conditioning system 100. The fluid flow can be delivered through the thermal conditioning system 100 along a flow path 110. This in the illustrated implementation the fluid moving device can be positioned, in general, upstream of the conditioning elements of the thermal conditioning system 100. However, in other implementations, a fluid moving device can be positioned downstream of the conditioning elements in addition to or in the alternative to an upstream fluid moving device.

The thermal conditioning system 100 can include a thermoelectric device (TED) 120. The TED 120 can be a Peltier device. The TED 120 can include a main-side 122 and a waste side 124. The TED 120 can be controlled based on application of a voltage and/or amperage. When used as a cooling device, the main-side 122 can be colder than the waste side 124. When used as a heating device, the main-side 122 can be hotter than the waste side 124.

The TED 120 can include a main-side heat exchanger 126 and/or a waste-side heat exchanger 128. In certain implementations, the heat exchangers can comprise a plurality of thin metal fins. The flow path 110 can split into a main-side flow path 132 and a waste-side flow path 134. The main-side flow path 132 can pass through the main heat exchanger 126. The waste-side flow path 134 can pass through the waste heat exchanger 128. The main-side flow path 132 can terminate at the climate-controlled environment or device. The waste-side flow path 134 can terminate at an exhaust.

The thermal conditioning system 100 can include a flow control valve 140. The flow control valve 140 can be upstream of the TED 120. However, it is anticipated that in other implementations the flow control valve can be positioned downstream of the TED 120 and/or that additional valves can be provided. For example, individual valves could be provided each of the flow paths 132, 134 for the main and waste sides of the thermal conditioning system. The flow control valve 140 can include a louver or flap 144. The position of the louver can proportion the fluid flow provided by the fluid moving device between the main and waste-side flow paths 132, 134. Optionally, the louver can proportion the fluid flow to a bypass flow path (not shown). The position of the louver can be controlled by a motor (e.g., a servo, step, or other motor type) or actuator. In the illustrated implementation, the flow control valve 140 is in the form of a flap valve, however other types of valves could be used such as needle, barrel or rotary valves and/or a combination of such valves.

Figure 1A:
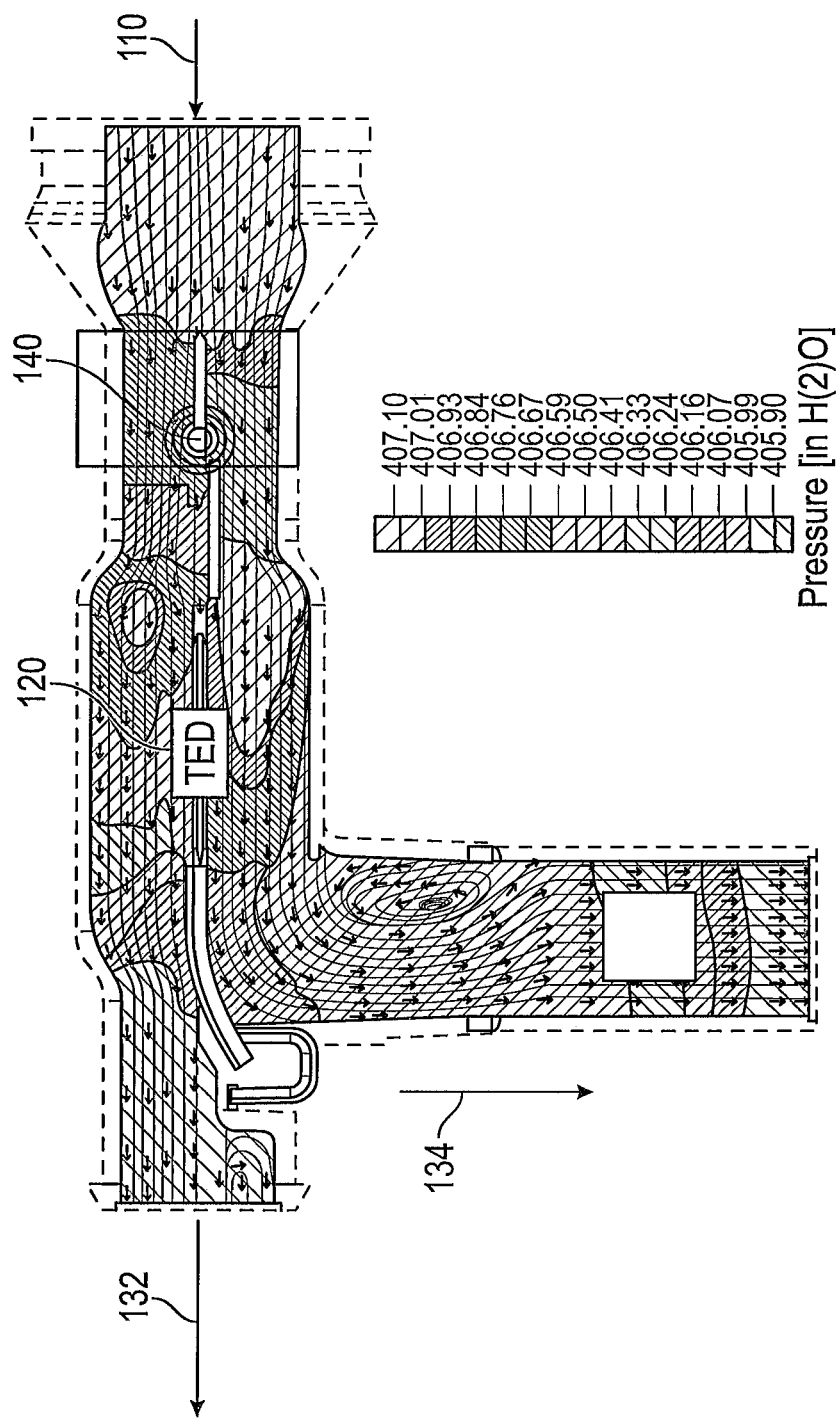
FIG. 1A shows fluid flow through the thermal conditioning system with the flow control valve in a neutral position.
Figure 1B:
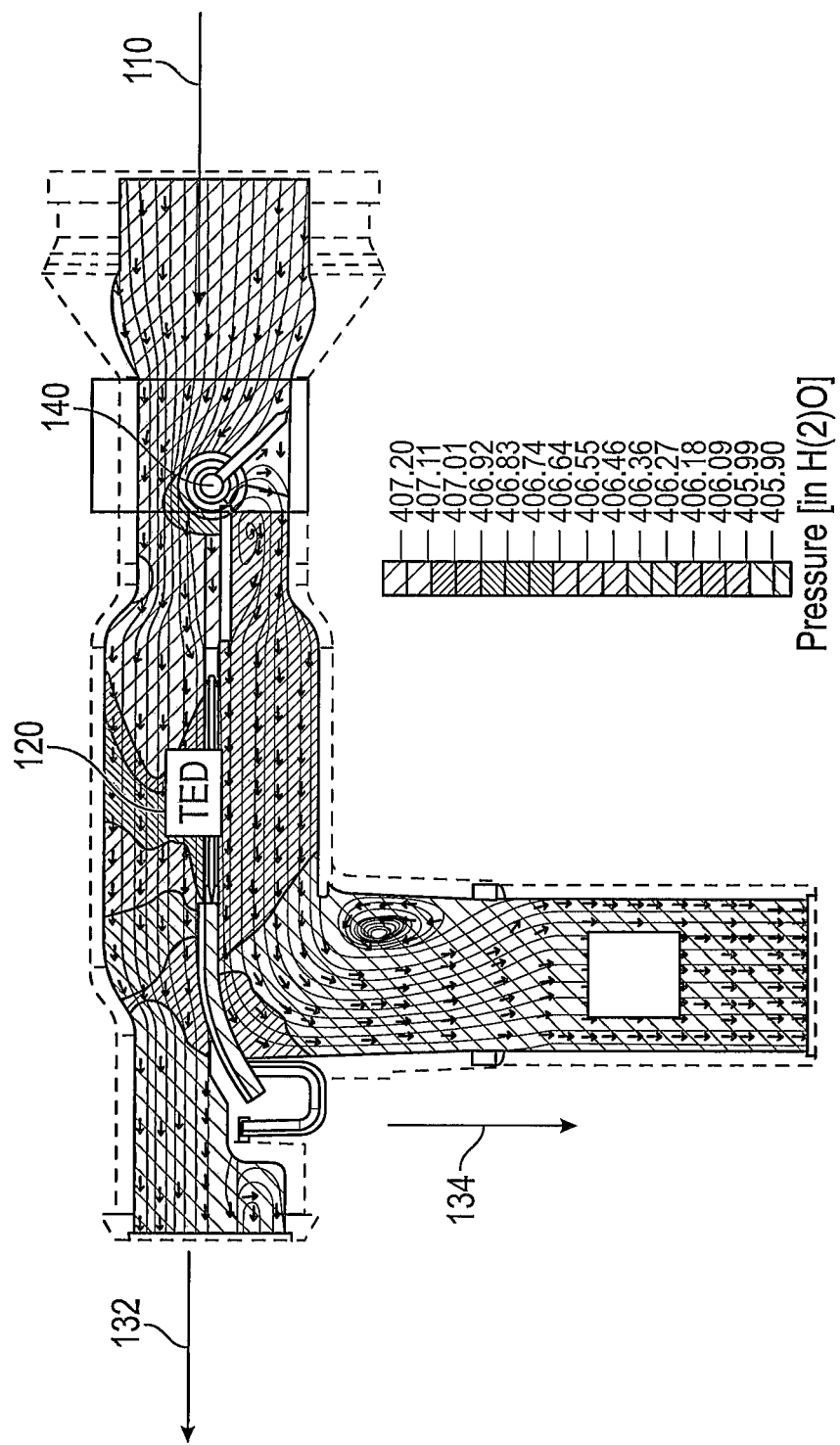
FIG. 1B shows fluid flow through the thermal conditioning system with the flow control valve in a waste-side blocking position.
Figure 1C:
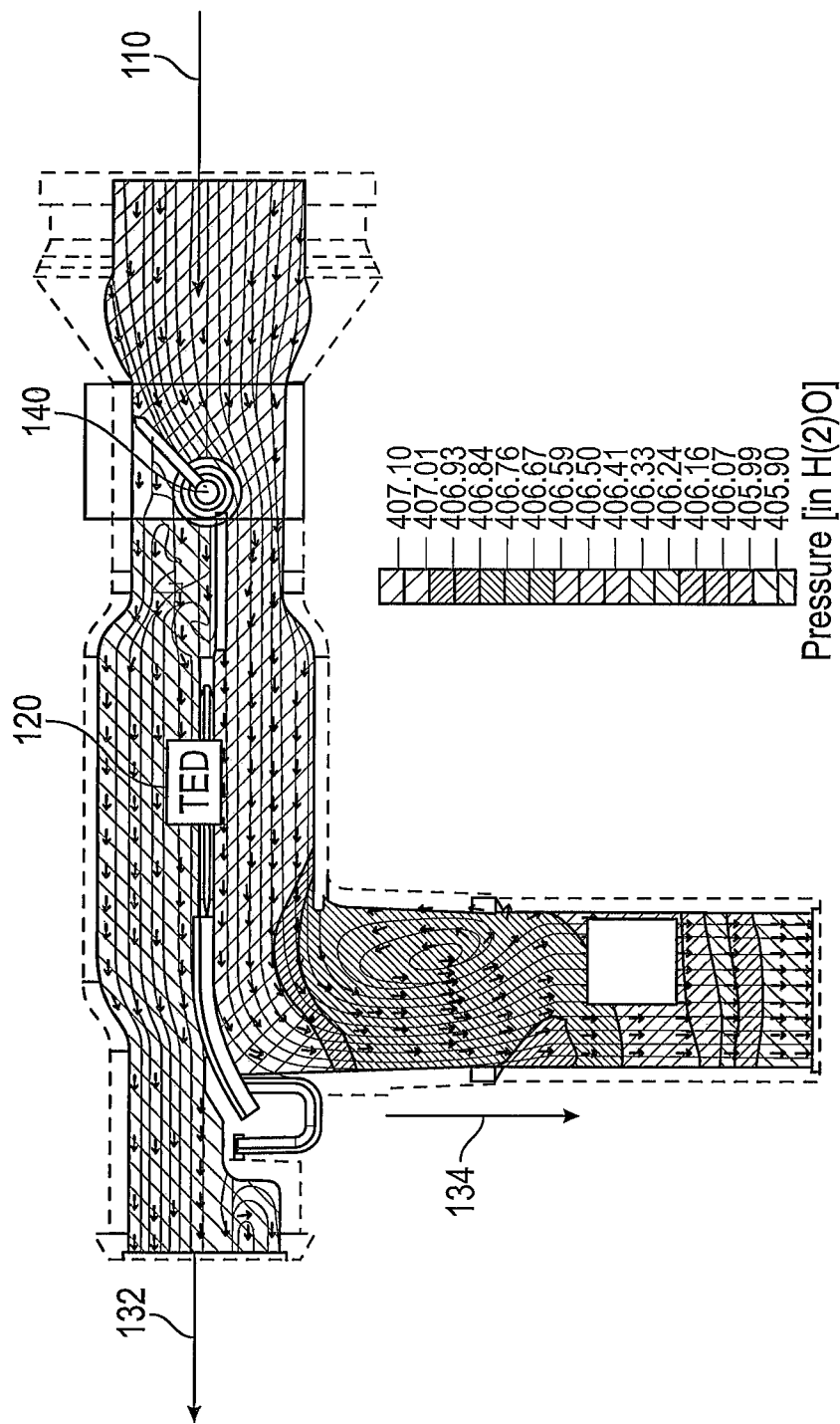
FIG. 1C shows fluid flow through the thermal conditioning system with the flow control valve in a main-side blocking position.

FIG. 1A shows pressure of the fluid flow through the thermal conditioning system 100 with the flow control valve 140 in a neutral position. FIG. 1B shows pressure of the fluid flow through the thermal conditioning system 100 with the flow control valve 140 in a position blocking the waste-side flow path 134. FIG. 1C shows pressure of the fluid flow through the thermal conditioning system 100 with the flow control valve 140 in a position blocking the main-side flow path 132.

Conventional climate-controlled systems can use a fluid moving device and TED for climate control. These systems can operate by varying the total air flow provided by the fluid moving device and the power provided to the TED to achieve the desired conditioned air temperatures and thermal conditioning capacities. The addition of the flow control valve 140 provides the thermal conditioning system 100 with additional control over the conditioning of the fluid flow compared with conventional systems. For example, the thermal conditioning system 100 can provide a greater change in air temperature, provide additional control of conditioned air temperature for any given fluid moving device and TED operating condition, and/or provide additional climate control operating modes or options as will be described in more detail below. Accordingly, the thermal conditioning system 100 can advantageously decrease time to sensation and/or increase efficiency of the TED 120 and/or fluid moving device.

Figure 2:
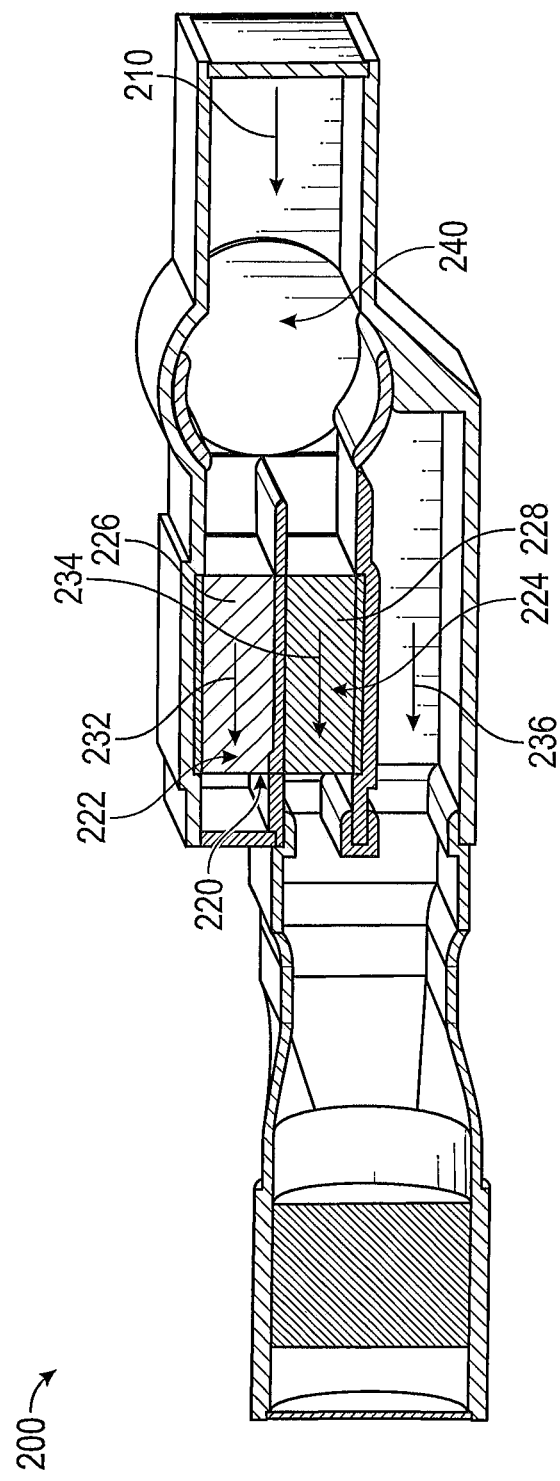
FIG. 2 shows another implementation of a thermal conditioning system including a flow control valve for directing a fluid flow along a main-side path, a waste side path, and a bypass path.

FIG. 2 shows another implementation of thermal conditioning system 200. The thermal conditioning system 200 can operate similarly to and/or include components similar to the thermal conditioning system 100. The thermal conditioning system can include a TED 220. The TED 220 can include a main-side 222 and a waste side 224. The TED 220 can include a main-side heat exchanger 226 and/or a waste-side heat exchanger 228.

The thermal conditioning system 200 can include a fluid flow path 210 for a fluid flow from a fluid moving device (not shown). The fluid flow path 210 can pass through a flow control valve 240. The flow control valve 240 in the illustrated implementation can be a rotary valve. The flow control valve 240 can direct the fluid flow through a main-side flow path 232, a waste-side flow path 234, and/or a bypass path 236.

Figure 2A:
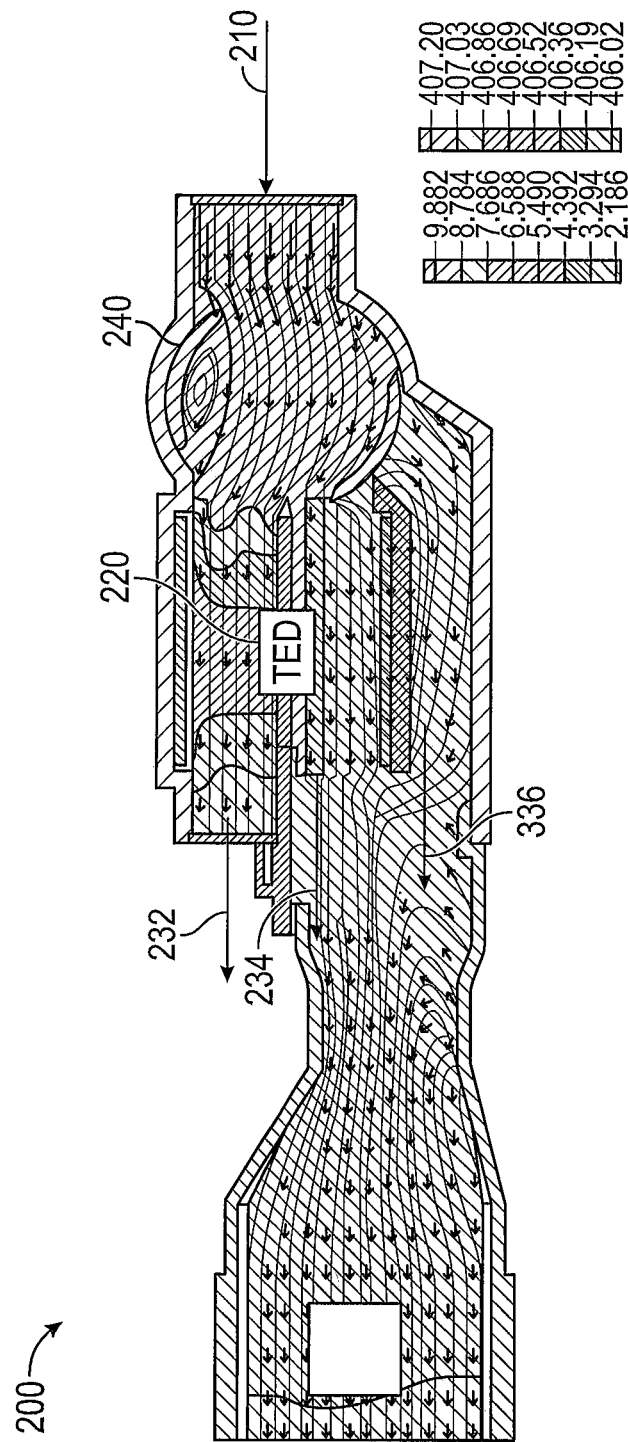
FIG. 2A shows fluid flow through the thermal conditioning system with the flow control valve blocking the bypass path and partially blocking the main-side path.
Figure 2B:
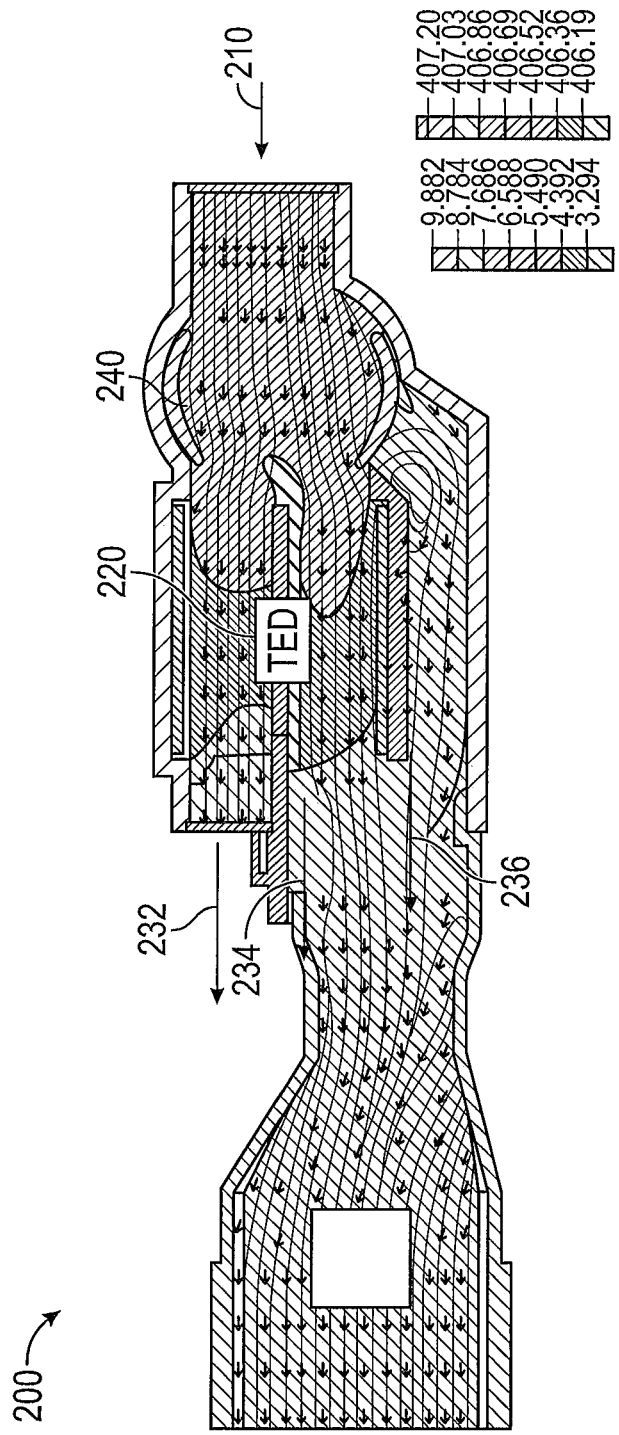
FIG. 2B shows fluid flow through the thermal conditioning system with the flow control valve blocking the bypass path.
Figure 2C:
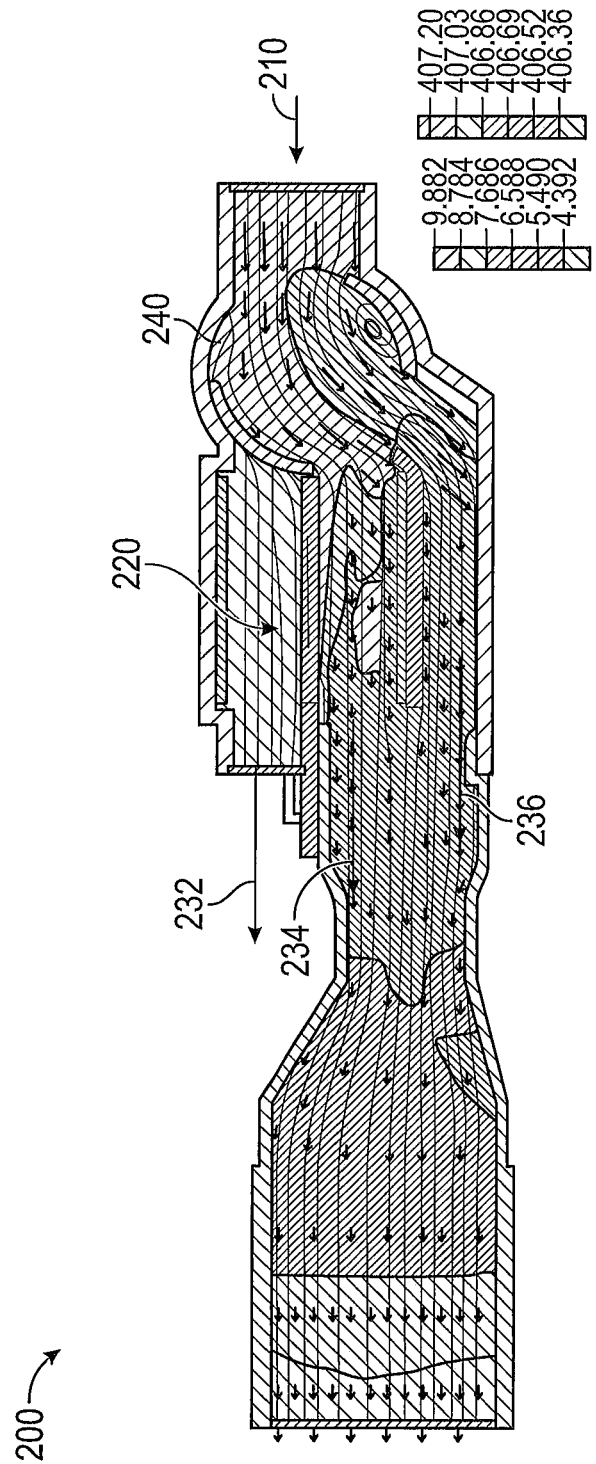
FIG. 2C shows fluid flow through the thermal conditioning system with the flow control valve blocking the waste side path.

FIG. 2A shows pressure of the fluid flow through the thermal conditioning system 200 with the flow control valve 240 in a position blocking the bypass path 236 and partially blocking the main-side flow path 232. FIG. 2B shows pressure of the fluid flow through the thermal conditioning system 200 with the flow control valve 240 in a position blocking the bypass path 236 only. FIG. 2C shows pressure of the fluid flow through the thermal conditioning system 200 with the flow control valve 240 in a position blocking the waste-side flow path 234.

Figure 3A:
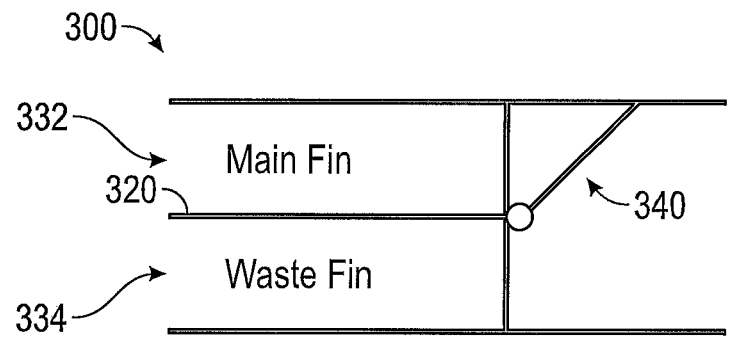
FIG. 3A shows a schematic thermal conditioning system including a flow control valve in a fully closed position blocking a main-side path.
Figure 3B:
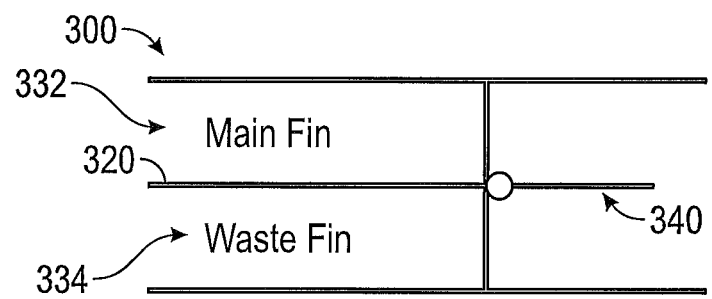
FIG. 3B shows the flow control valve in a neutral position between the main-side path and a waste-side path.
Figure 3C:
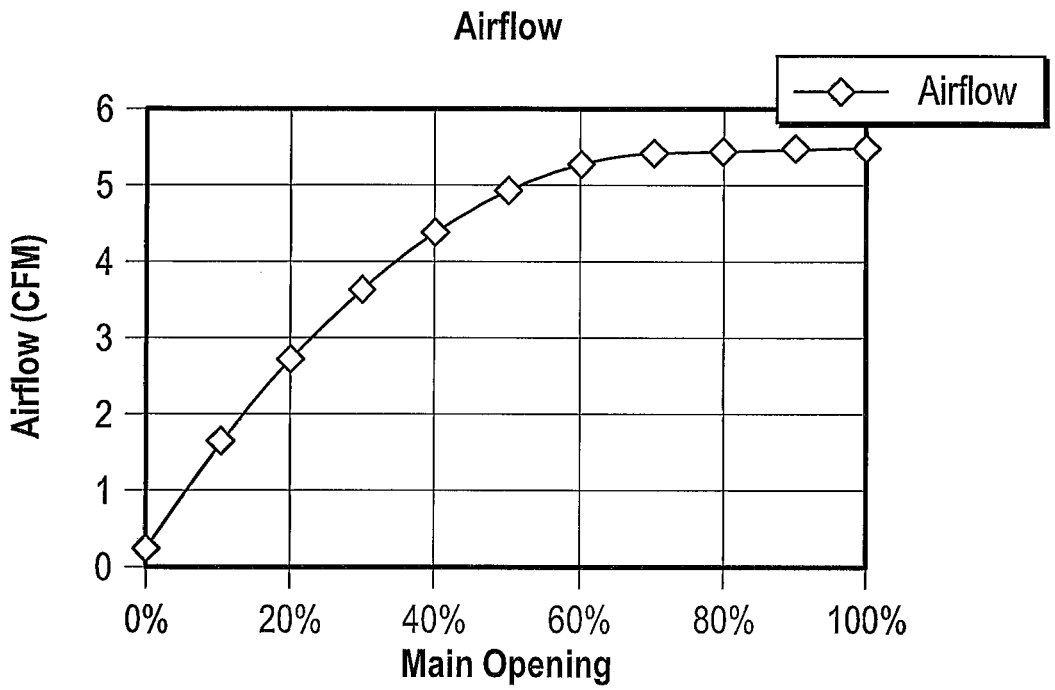
FIG. 3C is a graph showing airflow through the main-side path against the position of the flow control valve.
Figure 3D:
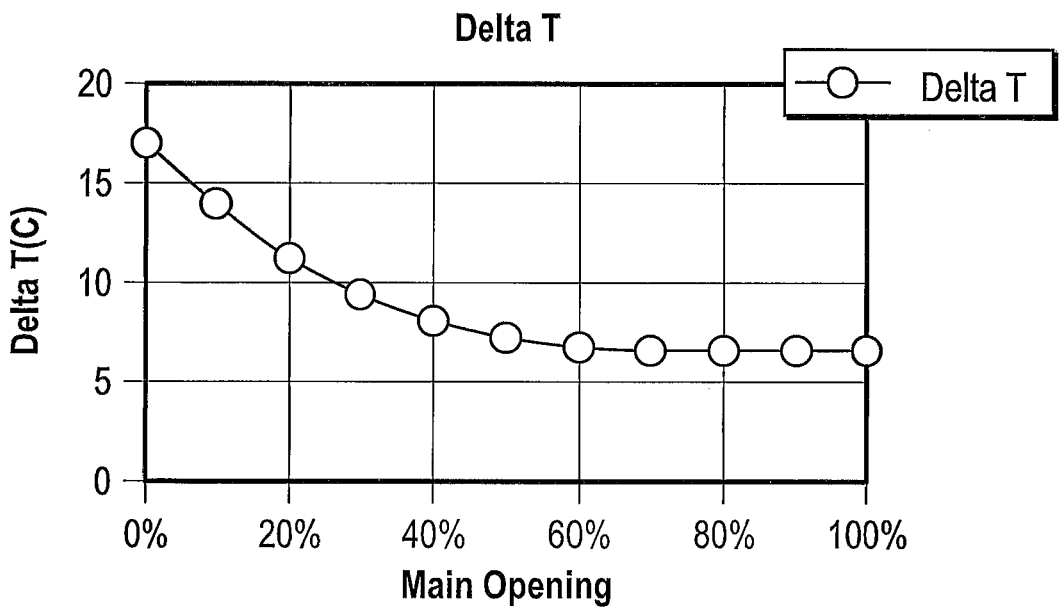
FIG. 3D is a graph showing a maximum temperature differential (Delta T) across the main and waste sides of the thermoelectric device of the thermal conditioning system against the position of the flow control valve.

FIG. 3A illustrates a thermal conditioning system 300 including a flow control valve 340, a TED 320, a main-side flow path 332 and a waste-side flow path 334. The flow control valve 340 in a fully closed position (0%) can block the main-side of the TED 320. FIG. 3B illustrates the flow control valve 340 in a fully open position (100%) allowing fluid flow over both main and waste sides of the TED 320. FIG. 3C is a graph showing airflow through a main-side flow path 332 for different open positions of the flow control valve 340. FIG. 3D is a graph showing a maximum temperature differential (Delta T) across the main and waste sides of the TED 320 for different open positions of the flow control valve 340.

As noted above, conventional climate-controlled systems divided in a fixed manner allow air flow over the main side and the waste side of a TED. In certain implementations, conventional climate-controlled systems with a fixed divided air flow between the main side and the waste side of the TED 320 can achieve a maximum temperature differential (Delta T) of around 7 degrees (C), as shown in FIG. 3D at the fully open (100%) position of the main-side flow path 332. Closing or limiting fluid flow along the main-side flow path 332 improves the Delta T (e.g., by reducing the total volume or air being heated or cooled on the main side). In certain implementations, the flow control valve 340 enables Delta Ts as high as around 17 degrees (C). Improvement of the Delta T can achieve lower temperatures for the conditioned air form the main-side flow path 332 that is delivered to the climate-controlled environment. In certain contexts, such as in an air-conditioned seating unit, the lower temperatures can be desirable as to produce an increased cooling sensation for a seat occupant. The configurations and operation illustrated and described with respect to FIGS. 3A and 3B can be used with the implementations of the thermal conditioning systems described above with respect to FIGS. 1 and 2.

Figure 4:
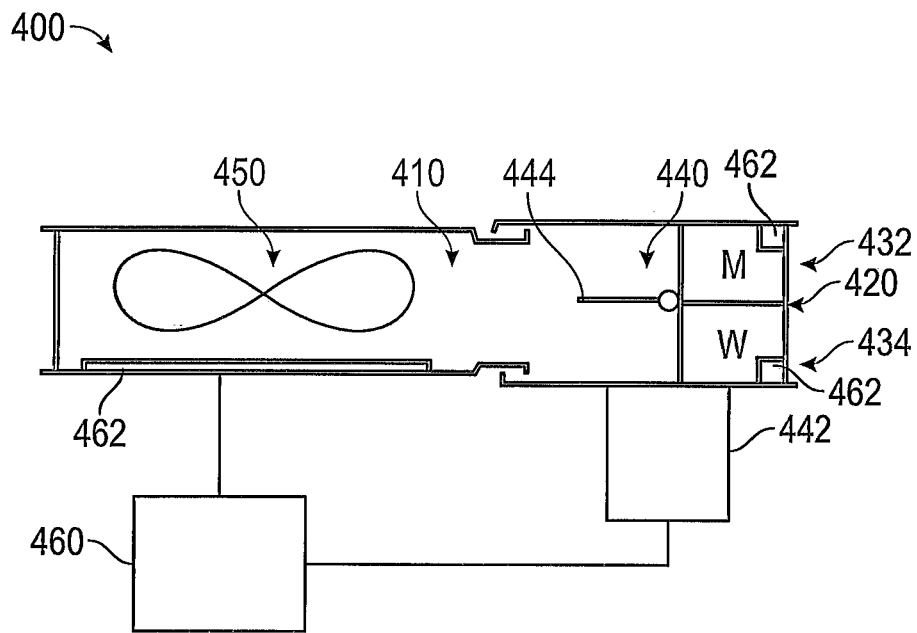
FIG. 4 shows a schematic thermal conditioning system including a flow control valve in a neutral position between a main-side flow path and a waste-side flow path.

FIG. 4 schematically illustrates a thermal conditioning system 400, similar to the thermal conditioning system 100. The thermal conditioning system 400 can include a fluid moving device 450 for moving a fluid flow along a fluid flow path 410. The fluid flow path 410 can proceed along a main-side flow path 432 and/or a waste-side flow path 434. The thermal conditioning system 400 can include a TED 420. The TED 420 can have a main side 422 and a waste side 424. The TED 420 can include one or more air heat exchangers (not shown). A flow control valve 440 can direct and/or proportion air along the main and/or waste-side flow paths 432, 434. The flow control valve 440 can include a motor 442 and/or a louver or rotor 444.

The thermal conditioning system 400 can include a controller 460. The controller 460 can be singular or spread across several control devices. The controller 460 can be operatively coupled with the motor 442 for controlling the flow control valve 440. The controller 460 can be operatively coupled with the TED 420 and/or the fluid moving device 450. The controller 460 can include a processor for executing programming instructions on a computer readable medium configured to operate the thermal conditioning system 400 according to one or more operation modes.

The thermal conditioning system 400 can include one or more sensors 462. The sensors 462 can include temperature and/or humidity sensors and configured to measure the fluid flow. The sensors 462 can be mounted in the fluid flow path 410, in the fluid moving device 450, in the main and/or waste-side flow paths 432, 434, and/or elsewhere within the thermal conditioning system 400 and in certain implementation the sensors 462 can be positioned upstream, downstream and/or within the main or waste-side heat exchangers. The sensors 462 can be communicatively coupled with the controller 460. The controller 460 can operate the thermal conditioning system 400 based, at least in part, on a signal from the sensors 462.

FIGS. 4-8 show illustrate the thermal conditioning system 400 with the flow control valve 440 in open, closed, and intermediate (partially open) positions according to various operation modes, as described below.

In certain implementations, the controller 460 can operate the thermal conditioning system 400 in a Conventional Mode which is schematically illustrated in FIG. 4. In the Conventional Mode, the fluid flow from the fluid moving device 450 passes over the main and waste sides 422, 424 (e.g., the volumetric fluid flow rates between the main and waste-side flow paths 432, 434) in an approximately equal and/or at a static predetermined ratio. The controller 460 (by operation of the flow control valve 440) modifies the conditioned air temperature by adjusting one or both of the power (e.g., voltage and/or amperage) provided to the TED 420 and the total fluid flow from the air moving device 450 (e.g., by speeding up or slowing).

Figure 5:
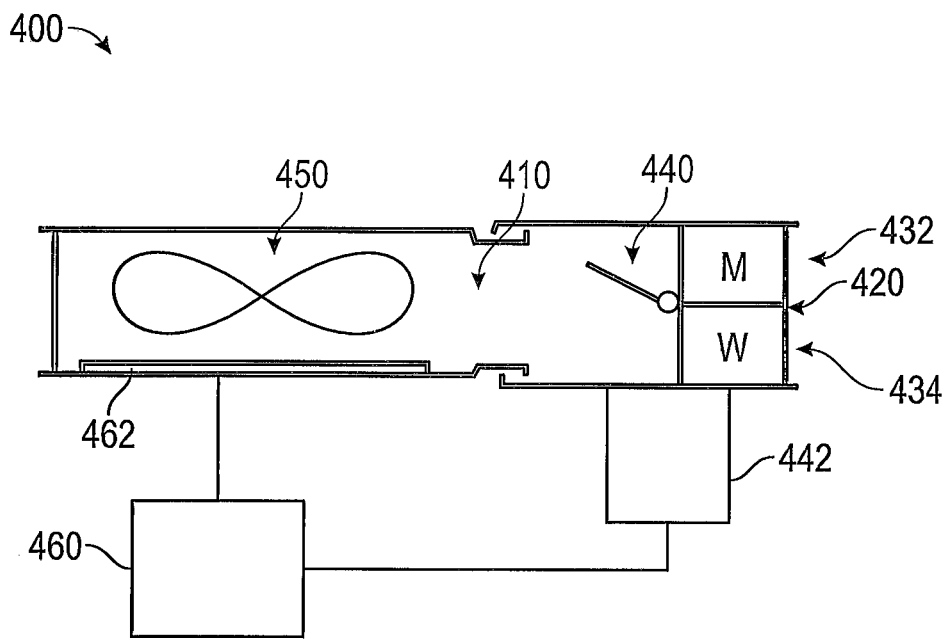
FIG. 5 shows the schematic thermal conditioning system with the flow control valve partially blocking the main-side flow path.
Figure 6:
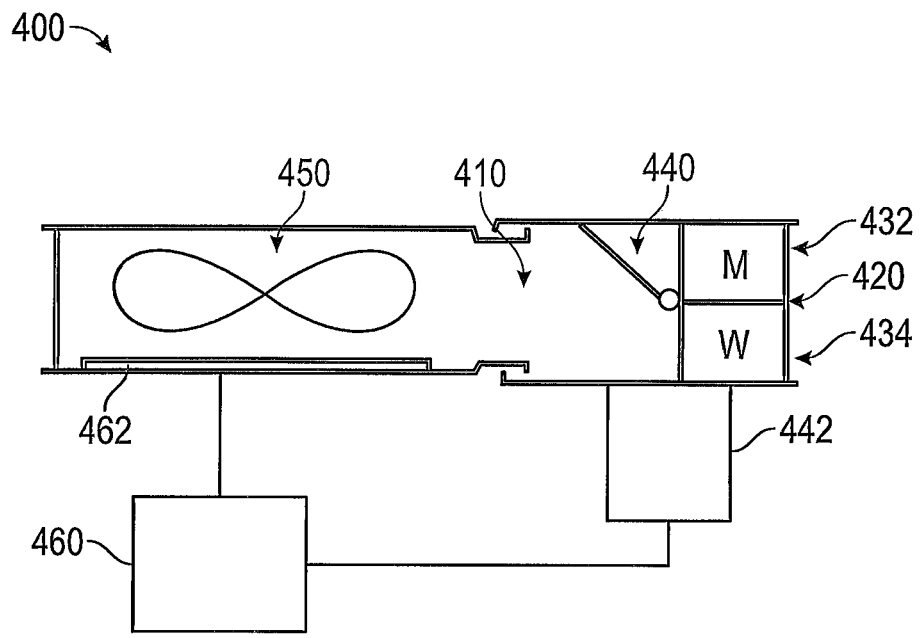
FIG. 6 shows the schematic thermal conditioning system with the flow control valve fully blocking the main-side flow path.

The controller 460 can operate the thermal conditioning system 400 in a High Delta T Mode, which is schematically illustrated in FIGS. 5 and 6. In the High Delta T Mode, the flow control valve 440 can partially or fully close the main-side flow path 432. The controller 460 can operate in the High Delta T Mode in a high temperature and/or low humidity cabin air operating environment (e.g., ambient temperature 32-45 degrees (C), relative humidity less than 20%). In the High Delta T Mode, the cabin air passing through the thermal conditioning system 400 can be cooled to lower temperatures than the Conventional Mode. The controller 460 (by operation of the flow control valve 440) can proportion more fluid flow to the waste-side flow path 434 to achieve a high Delta T and a low conditioned air temperature on the main-side flow path 432 (e.g., relative to the conditioned air temperature on the main-side flow path 432 with fluid flow along the main and waste-side flow paths 432, 434 being equal). In the High Delta T Mode, the conditioned air temperature can be prioritized over conditioned air flow. The High Delta T Mode, can include a conditioned air target temperature. In the High Delta T Mode, the conditioned air temperature target can be 25 degrees (C). This can be to reduce time to sensation by occupant and/or provide optimal conditioned air temperature for comfort.

Figure 9:
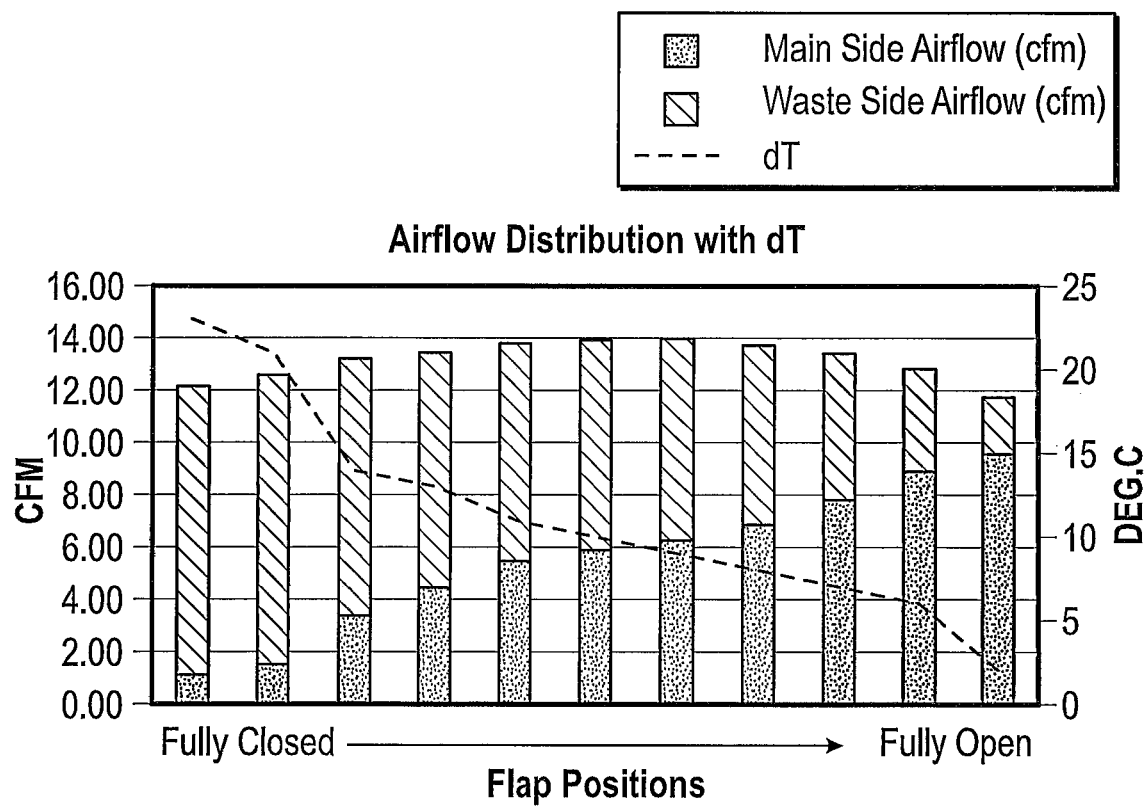
FIG. 9 is a graph showing a maximum temperature differential (Delta T) across the main and waste sides of the thermoelectric device of the thermal conditioning system and volumetric flow rates across the main and waste sides against the position of the flow control valve.

FIG. 9 illustrate a chart showing the dT (temperature differential between the main and waste-side flow paths 432, 434) and total flow rates and ratios of flow rates between the main and waste-side flow paths 432, 434 against the position of the flow control valve 440 (in 10° increments P0-P10). In certain implementations, the High Delta T Mode can be represented in the chart of FIG. 9 between P0 and any of P1-P2. In certain implementations of the High Delta T Mode, the flow control valve 440 can be open approximately between 0% and 20%, 0% and 10%, or 0% and 5%. In certain implementations of the High Delta T Mode, a ratio of the fluid flow along the main and waste-side flow paths 432, 434 can be approximately between 0 and 0.3, 0.1 and 0.3, 0.1 and 0.2. In certain implementations of the High Delta T Mode, the fluid flow volume through the main side can be approximately between 0 and 3 CFM (cubic feet/minute), 0 and 2 CFM, and 0 and 1 CFM. In certain implementations of the High Delta T Mode, the dT (temperature differential between the main and waste-side flow paths 432, 434) can be approximately between 25° C. and 12° C. or 25° C. and 20° C.

Figure 7:
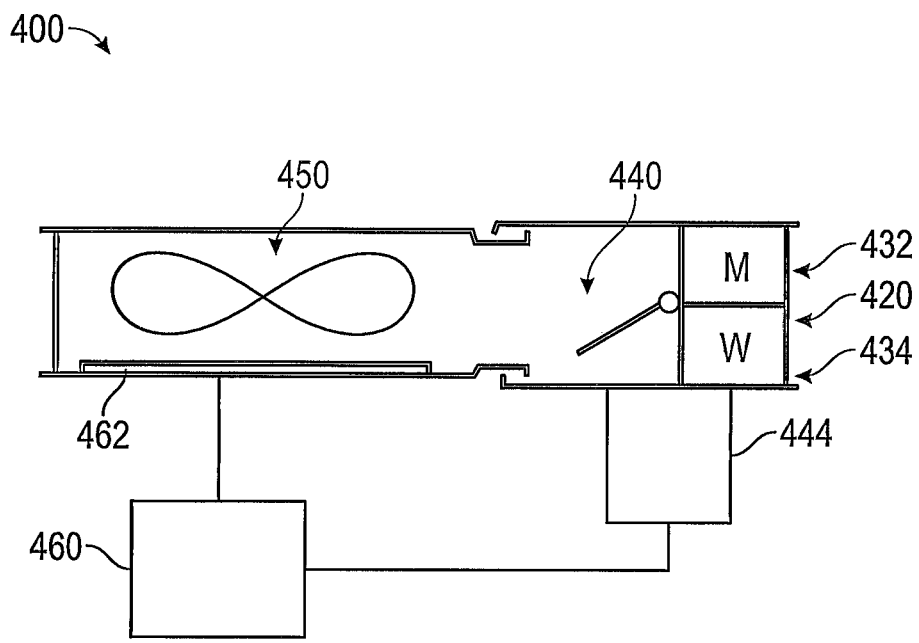
FIG. 7 shows the schematic thermal conditioning system with the flow control valve partially blocking the waste-side flow path.
Figure 8:
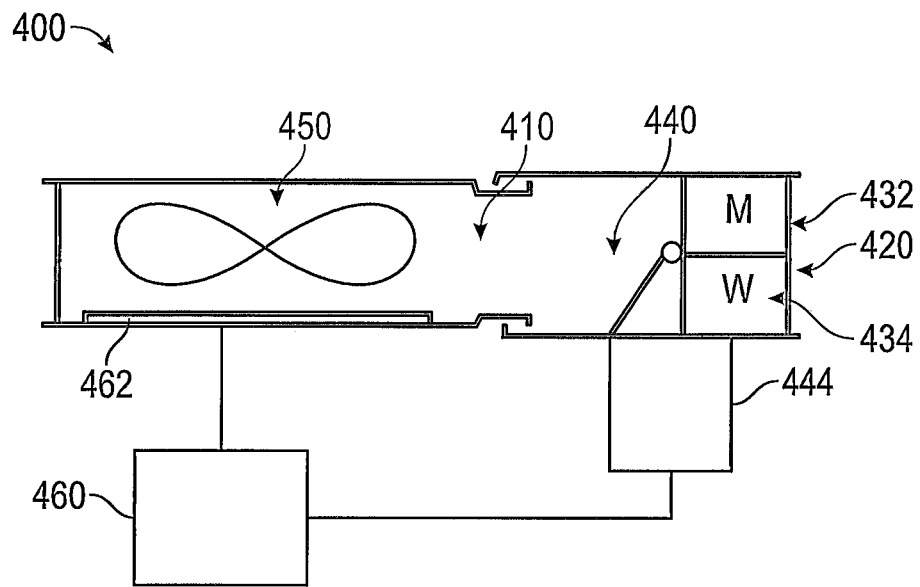
FIG. 8 shows the schematic thermal conditioning system with the flow control valve fully blocking the waste-side flow path.

The controller 460 can operate the thermal conditioning system 400 in a High Air Flow Mode which is schematically illustrated in FIGS. 7 and 8. In the High Air Flow Mode, the flow control valve 440 can partially or fully close the waste-side flow path 434. The controller 460 can operate in the High Air Flow Mode in cabin air environments where humidity limits achieving the desired (high) Delta T without condensation (e.g., ambient temperature 25-32 degrees (C), relative humidity less than 60%). The controller 460 can proportion more or all of the fluid flow to the main-side flow path 432 compared with the waste-side flow path 434 to increase cooling capacity for the thermal system 400 operating at the limited Delta T (which may be at a higher conditioned air temperature). In the High Air Flow Mode, the cooling capacity of the thermal system 400 can be increased without generating condensation. Further, the controller 460 can control power to the TED 420 to achieve the desired conditioned air temperatures and/or humidities.

In certain implementations, the High Air Flow Mode can be represented in the chart of FIG. 9 between P1 or P2 and P10. In certain implementations of the High Air Flow Mode, the flow control valve 440 can be open approximately between 20% and 100%, 10% and 100%, or 5% and 100%. In certain implementations of the High Air Flow Mode, the flow control valve 440 can be open greater than approximately 5%, 10%, or 20%. In certain implementations of the High Air Flow Mode, a ratio of the fluid flow along the main and waste-side flow paths 432, 434 can be approximately 1.0 or between 0.5 and 5.0 or greater. In certain implementations of the High Air Flow Mode, the fluid flow volume through the main side can be approximately between 4 and 10 CFM, or greater than approximately 2, 3, or 4 CFM. In certain implementations of the High Air Flow Mode, the dT (temperature differential between the main and waste-side flow paths 432, 434) can be approximately between 13° C. and 1° C. or less than approximately 13° C.

The controller 460 can operate the thermal conditioning system 400 in a Sequential High Delta T, High Air Flow Mode. The controller 460 can operate in the Sequential High Delta T, High Air Flow Mode in cabin air environments with humidity limiting cabin environments (e.g., ambient temperature greater than 25 degrees (C) and relative humidity causing condensation within the thermal conditioning system 400). The controller 460 can operate for a first period in the High Delta T Mode, during which an acceptable amount of condensation can form. The controller 460 can then switch to operation in the High Air Flow Mode to remove the condensation for a second period. The periods of operation may be set to maintain a desired range in Delta T. The Delta T range can be set, for example, to avoid occupant perception of the conditioned air temperature range and/or to maintain occupant comfort. Further, the controller 460 can control power to the TED 420 to achieve the desired conditioned air temperatures and/or humidities. In another operative example, the controller 460 can operate the High Delta T Mode past the condensation point and then in the High Air Flow Mode to dry the thermal conditioning system 400. This process can be noisy and could be used as a preconditioned mode (no occupant in the climate-controlled environment).

The controller 460 can operate the thermal conditioning system 400 in a Ventilation Mode which is schematically illustrated in FIGS. 7 and 8. The controller 460 can operate in the Ventilation Mode in cabin air environments where the cabin air temperature is sufficient to achieve occupant comfort. The controller 460 will proportion substantially all fluid flow over the main-side flow path 432 with the TED 420 powered off and/or through a bypass flow path. In the Ventilation Mode, the thermal conditioning system 400 can provide high ventilation rates for both rotary and louver type flow control valves. The controller 460 can operate in the Ventilation Mode for a first period and operate in one or more of the Conventional Mode, the High Delta T Mode, the High Air Flow Mode, and/or the sequential High Delta T, High Air Flow Mode for a second period.

The controller 460 can operate the thermal conditioning system 400 in a Modified Heating Mode. The controller 460 can operate in the Modified Heat Mode in cabin air environments where the cabin air temperature is low and heating is desired for occupant comfort. The TED 420 can be operated with a reverse polarity relative to the above-mentioned cooling modes. The controller 460 can operate the flow control valve 440 to proportion all or a majority of the fluid flow over the main side 422 (acting as a heater) to increase heating capacity and avoid losses associated with heat removal and air flow on waste side 424. To decrease a time to sensation for the heated air, the TED 420 can be operated similar to the High Delta T mode with the flow control valve 440 partially or fully closes on the main-side path 432. This can increase the temperature of the cabin air flowing through the thermal conditioning system 400 relative to operation in the Modified Heating Mode.

In another mode, the thermal conditioning system 400 can operate in cool and/or damp air cabin environments. The controller 460 can increase fluid flow (e.g., by operation of the fluid moving device 450) through the thermal conditioning system 400 to reduce occupant wettedness and/or increase drying of the occupant, which is schematically illustrated in FIGS. 7 and 8. The controller 460 can adjust the flow control valve 440 and/or power to the TED 420 to increase the conditioned air temperature to counteract the evaporative cooling of the occupant associated with the drying.

The controller 460 can adjust the fluid moving device speed based on the position of the flow control valve 440. To maintain a desired fluid flow where the position of the flow control valve 440 is increasing the backpressure, the fluid moving device speed may need to be decreased because at higher backpressures, turbulence within the fluid flow path 410 may cause fluid moving device speed to increase without a corresponding increase in air flow.

In the High Delta T Mode, the thermal conditioning system 400 can avoid generating condensation on the main side 422 by providing sufficient fluid flow across the main side of the TED 420. The sensors 462 can be located on both the main-side flow path 432 and the waste-side flow path 434. The sensors 462 can be used for detecting or measuring a temperature differential between the fluid flow on the main-side flow path 432 and the waste-side flow path 434. Alternatively, the sensors 462 can be upstream of the TED 420 and downstream of the TED 420 on the main-side flow path 432. The controller 460 can receive a signal from the sensors 462 indicating the temperature differential. The controller 460 can compare the temperature differential from the signal with an expected temperature differential between the main and waste sides of the TED 420 for a given position of the flow control valve 440. If the measured temperature differential is less than the expected temperature differential (e.g., within a margin of error), this can mean there is condensation in the main-side flow path. Accordingly, the controller 460 can change operation of the control valve 440 and/or the fluid moving device 450 to increase fluid flow across the main-side flow path to reduce the condensation/humidity. In another implementation, the thermal conditioning system 400 can include a humidity sensor on the main-side flow path to detect humidity or condensation. Based on a signal from the humidity sensor, the controller 460 can alter operation of the operation of the control valve 440 and/or the fluid moving device 450 to increase fluid flow across the main-side flow path to reduce the condensation/humidity.

Figure 10:
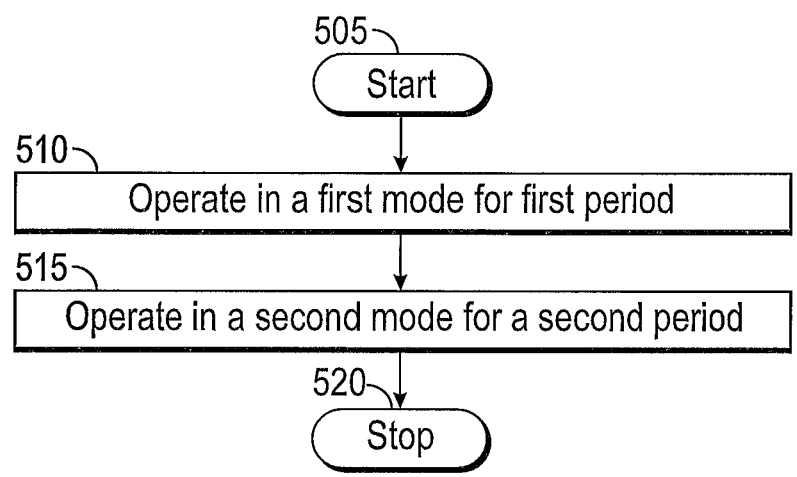
FIG. 10 shows a flow chart for operating a thermal conditioning module.

FIG. 10 outlines a control method claim for a thermal conditioning system, such as the systems 100, 200, 300, 400 describe above. At step 505, the method can be initiated. Initiation can be based on providing power to vehicle or other system of which the thermal conditioning system is a component or to the thermal conditioning system itself. At step 510, the thermal conditioning system can operate in a first mode for a first period. The first mode can be any of the operation modes described above. In one particular implementation, the first mode is the High Delta T mode. In the first mode, a fluid flow passes through the thermal conditioning system primarily along a waste-side path. The first mode can include providing power to a TED having a main side and a waste side. The first mode can be an initial mode. In one particular implementation, the High Delta T mode is the initial mode.

At step 515, the thermal conditioning system can operate in a second mode for a second period in which the fluid flow that passes through the thermal conditioning system is changed relative to the fluid flow during the first mode. The fluid flow during the second mode can be directed in a different ratio between the main-side path and the waste-side path than during the first mode. In the second mode, the fluid flow along the main-side path can be increased relative to the fluid flow along the main-side path in the first mode. This can increase the temperature of the fluid flow along the main-side path (e.g., reduce the temperature differential between the main and waste sides of the TED 420) and/or reduce condensation or humidity therein. In the second mode, the fluid flow along the main-side path can be increased to match the fluid flow along the waste-side path. In the second mode, the fluid flow can be primarily along the main-side path. In certain implementations, the second mode can be the High Air Flow mode or the Ventilation Mode.

Transitioning between the main-side path and the waste-side path can be accomplished using a valve to change the direction of the fluid flow between the main-side flow path and the waste-side flow path. Transitioning operation from the first mode to the second mode can be based on any of several variables. The first period can be based on a pre-selected time after which the transition automatically occurs. The transition can be based on detecting a target temperature of the fluid flow using a temperature sensor (e.g., on the main-side path) and/or holding that temperature for a specified time period. The transition can be based on based on detecting condensation. The transition can be based on measuring a temperature differential between the fluid flow on the main-side path and the waste-side path. Too low a temperature differential can indicate condensation or humidity in the main-side path. The transition can be based on maintaining a pre-set temperature differential between the main-side path and the waste-side path. The first and second time periods can be set to maintain a pre-set temperature differential between the main-side and the waste side of the thermoelectric device.

The control method can optionally include operating the thermal conditioning system in a third mode for a third period in which the fluid flow through the thermal conditioning system can be decreased relative to the second mode. In the third mode, power to the TED can be decreased relative to the second mode. The third mode can be used to reduce power consumption by the thermal conditioning system. For example, the third mode can be operable once an comfortable cabin temperature is achieved through operation of the first and second modes.

Figure 11:
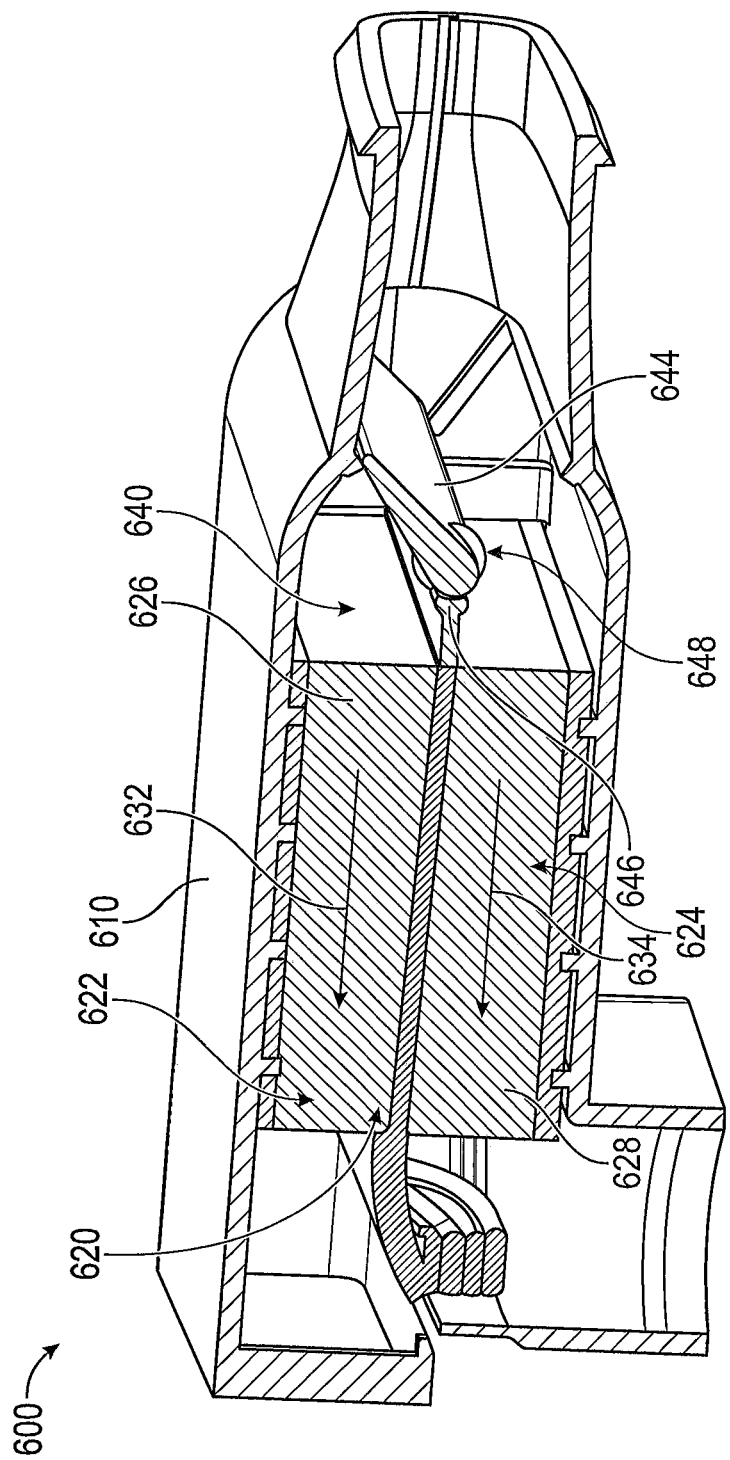
FIG. 11 shows another implementation of a thermal conditioning module.

FIG. 11 shows another implementation of a thermal conditioning system 600 including a housing 610. The system 600 can include a TED 620. The TED 620 can be a single unit or comprised of two or more separate TED units. The housing 610 of the system 600 can include a main-side flow path 632 and a waste-side flow path 634. The system 600 can include a flap valve 640. The flap valve 640 can include a louver 644. The louver 644 can be located between the main-side flow path 632 and the waste-side flow path 634. The louver 644 can be movable by a motor, such as a stepper motor. The louver 644 can be rotatable about an axis by the motor. The louver 644 can be mounted on a center wall 646 of the housing 610. The center wall 646 can include one or more mounts 648 for securing the shaft 647. This arrangement can improve air flow over the louver 644.

To assist in the description of the disclosed implementations, words such as upward, upper, downward, lower, vertical, horizontal, upstream, and downstream have been used above to describe the accompanying figures. It will be appreciated, however, that the illustrated implementations can be located and oriented in a variety of desired positions.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component via another component or directly connected to the second component.

The functions of a controller described herein may be stored as one or more instructions on a processor-readable or computer-readable medium. The term "computer-readable medium" refers to any available medium that can be accessed by a computer or processor. By way of example, and not limitation, such a medium may comprise random access memory (RAM), read-only memory (ROM), electrically erasable programmable read-only memory (EEPROM), flash memory, compact disc read-only memory (CD-ROM) or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor.

Although several implementations and examples are disclosed herein, the present application extends beyond the specifically disclosed implementations to other alternative implementations and/or uses of the inventions and modifications and equivalents thereof. It is also contemplated that various combinations or subcombinations of the specific features and aspects of the implementations may be made and still fall within the scope of the inventions. Accordingly, it should be understood that various features and aspects of the disclosed implementations can be combine with or substituted for one another in order to form varying modes of the disclosed inventions. Thus, it is intended that the scope of the present inventions herein disclosed should not be limited by the particular disclosed implementations described above, but should be determined only by a fair reading of the claims that follow.

Although the foregoing description of the preferred implementations has shown, described, and pointed out certain novel features, it will be understood that various omissions, substitutions, and changes in the form of the detail of the apparatus as illustrated, as well as the uses thereof, may be made by those skilled in the art without departing from the spirit of this disclosure. Consequently, the scope of the present inventions should not be limited by the foregoing discussion, which is intended to illustrate rather than limit the scope of the inventions.

What is claimed is:

1. A system for thermally conditioning and moving a fluid, comprising:
    a housing comprising:
        an inlet of a fluid flow path;
        a central wall configured to divide the fluid flow path into a main-side fluid flow path and a waste-side fluid flow path;
        an outlet of the main-side fluid flow path; and
        an exhaust of the waste-side fluid flow path;
    a thermoelectric device configured to convert electrical energy into thermal energy producing a temperature change in response to an electrical current being applied thereto, the thermoelectric device positioned between the main-side fluid flow path and the waste-side fluid flow path and downstream of the central wall, the thermoelectric device having a main side aligned with the main-side fluid flow path and a waste side aligned with the waste-side fluid flow path;
    a fluid moving device configured to produce a fluid flow along the fluid flow path that is in thermal communication with the thermoelectric device so that the thermal energy generated by the thermoelectric device is transferred to the fluid flow; and
    a flow control valve positioned upstream of the thermoelectric device along the fluid flow path and positioned adjacent to the central wall, the flow control valve configured to direct the fluid flow path into the main-side fluid flow path along the main side of the thermoelectric device and the waste-side fluid flow path along the waste side of the thermoelectric device, to at least partially close the waste-side fluid flow path and to at least partially close the main-side fluid flow path.

2. The system of claim 1, further comprising:
    a control unit operatively connected with the fluid moving device and the flow control valve and configured to operate the fluid moving device and the flow control valve.

3. The system of claim 2, further comprising:
    a sensor configured to provide a signal that is indicative of a temperature of the fluid flow,
    wherein the control unit is configured to operate the flow control valve based on the signal.

4. The system of claim 2, wherein the control unit is configured to adjust the flow control valve wherein less than 20% of a total volume of the fluid flow on the main-side fluid flow path and the waste-side fluid flow path is directed to the main-side fluid flow path to achieve a high temperature differential between the main side and the waste side of the thermoelectric device.

5. The system of claim 2, wherein the control unit is configured to adjust a flow control valve position based on a desired main-side temperature.

6. The system of claim 5, wherein the control unit is configured to lower a main-side temperature and/or increase a temperature differential between the main side and the waste side by adjusting the flow control valve to direct more of the fluid flow to the waste-side fluid flow path than to the main-side fluid flow path.

7. The system of claim 1, wherein the fluid moving device is positioned upstream of the thermoelectric device and the flow control valve along the fluid flow path.

8. The system of claim 1, wherein the fluid flow over the main side of the thermoelectric device on the main-side fluid flow path is parallel to and in a same direction as the fluid flow over the waste side of the thermoelectric device on the waste-side fluid flow path.

9. The system of claim 1, wherein the flow control valve includes a louver coupled with a rotatable shaft of a motor.

10. The system of claim 1, wherein the central wall extends into the thermoelectric device between the main side and the waste side.

11. The system of claim 1, wherein the flow control valve comprises a flap valve.

12. A control method for a thermal conditioning system:
    providing power to a TED of the thermal conditioning system having a main side and a waste side;
    operating the thermal conditioning system in a first mode for a first period in which a fluid flow passes through the thermal conditioning system; and
    directing the fluid flow with a valve during the first period such that a first portion of the fluid flow is directed through a waste-side flow path along the waste side of the TED at a first flow rate and a second portion of the fluid flow is directed through a main-side flow path along the main side of the TED at a second flow rate, wherein the valve is positioned adjacent a central wall positioned between the main-side flow path and the waste-side flow path, the central wall positioned upstream of the TED, wherein the valve is configured to at least partially close the waste-side flow path and to at least partially close the main-side flow path.

13. The control method of claim 12, further comprising:
    detecting a target temperature of the fluid flow using a temperature sensor;
    changing operation from the first mode to a second mode based on detecting the target temperature;
    operating the thermal conditioning system in the second mode for a second period; and
    adjusting a ratio between the first flow rate and the second flow rate as compared to the first mode.

14. The control method of claim 13, wherein the target temperature is detected on the main side.

15. The control method of claim 13, further comprising measuring a temperature differential between the waste-side flow path and the main-side flow path using temperature sensors and changing operation from the first mode to the second mode based on the measured temperature differential.

16. The control method of claim 13, further comprising detecting a target temperature differential between the waste-side flow path and the main-side flow path using temperature sensors, wherein the first period and the second period are set to maintain the target temperature differential.

17. The control method of claim 13, further comprising operating the thermal conditioning system in a third mode for a third period, wherein a rate of the fluid flow during the third period is less than the rate of the fluid flow during the second period.

18. The control method of claim 13, further comprising operating the thermal conditioning system in a third mode for a third period, wherein the power provided to the TED during the third period is decreased relative to the power provided to the TED during the second period.

19. The control method of claim 12, wherein the first mode is an initial mode.

20. A thermal conditioning system, comprising:
a TED having a main side and a waste side;
a housing comprising a fluid flow path, the fluid flow path including:
    a main-side path along the main side of the TED;
    a waste-side path along the waste side of the TED; and
    an inlet conduit upstream of the main-side path and the waste-side path;
a fluid moving device configured to produce a fluid flow along the fluid flow path from the inlet conduit toward the main-side path and the waste-side path;
a first temperature sensor configured to measure temperature in the main-side path;
a second temperature sensor configured measure temperature in the waste-side path;
a valve positioned within the inlet conduit, the valve configured to at least partially block fluid communication between the inlet conduit and the main-side path based on a position of the valve to reduce fluid flow along the main-side path and increase fluid flow along the waste-side path and to at least partially block fluid communication between the inlet conduit and the waste-side path based on the position of the valve to reduce fluid flow along the waste-side path and increase fluid flow along the main-side path; and
a controller configured to:
    operate the thermal conditioning system in a first mode for a first period in which the fluid moving device produces a first fluid flow that passes along the waste-side path at a first flow rate and a second fluid flow that passes along the main-side path at a second flow rate;
    determine a temperature differential between the waste-side path and the main-side path based on temperature measurements received from the first temperature sensor and the second temperature sensor; and
    operate the thermal conditioning system in a second mode for a second period based on the determined temperature differential, wherein in the second mode the position of the valve is adjusted relative to the position of the valve during the first mode to change a ratio between the first flow rate and the second flow rate.

21. The system of claim 20, wherein the first mode is an initial mode.

22. The system of claim 20, wherein the valve comprises a first louver configured to open, close and partially close fluid communication between the inlet conduit and the main-side path based on the position of the valve.

23. The system of claim 22, wherein the valve further comprises a second louver to control fluid communication between the inlet conduit and the waste-side path based on the position of the valve.

24. The system of claim 23, wherein the valve comprises a rotary valve with the first louver and the second louver.

25. The system of claim 20, wherein the housing further includes a bypass path configured to direct at least a portion of the fluid flow to bypass the main-side path and the waste-side path.

26. The system of claim 20, wherein the controller is further configured to adjust the position of the valve based on a desired main-side path temperature.

* * * * *